United States Patent
Chansarkar et al.

(10) Patent No.: US 9,869,770 B2
(45) Date of Patent: Jan. 16, 2018

(54) CONTROL AND FEATURES FOR SATELLITE POSITIONING SYSTEM RECEIVERS

(71) Applicant: CSR Technology Inc., San Jose, CA (US)

(72) Inventors: Mangesh Chansarkar, Fremont, CA (US); Sundar Raman, Fremont, CA (US); Charles P. Norman, Huntington Beach, CA (US); Paul A. Underbrink, Lake Forest, CA (US); Henry D. Falk, Long Beach, CA (US); James Brown, Laguna Beach, CA (US); Robert Harvey, San Francisco, CA (US); Peter Michali, Irvine, CA (US); William Higgins, Marlon, IA (US); Gensheng Zhang, Cupertino, CA (US); Qingwen Zhang, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 14/568,520

(22) Filed: Dec. 12, 2014

(65) Prior Publication Data
US 2015/0097728 A1 Apr. 9, 2015

Related U.S. Application Data

(62) Division of application No. 13/193,863, filed on Jul. 29, 2011, now Pat. No. 8,947,300, which is a division
(Continued)

(51) Int. Cl.
*G01S 19/13* (2010.01)
*G01S 19/37* (2010.01)
(Continued)

(52) U.S. Cl.
CPC ............ *G01S 19/13* (2013.01); *G01S 19/24* (2013.01); *G01S 19/34* (2013.01); *G01S 19/37* (2013.01);
(Continued)

(58) Field of Classification Search
CPC ...... H04B 1/69; H04B 1/707; H04B 2201/69; H04B 2201/707; H04B 2201/70715;
(Continued)

(56) References Cited

U.S. PATENT DOCUMENTS 3,939,474 A   2/1976   Coleman et al.
4,426,712 A   1/1984   Gorski-Popiel
(Continued)

FOREIGN PATENT DOCUMENTS

EP   0428329 A2   5/1991
EP   0511741      11/1992
(Continued)

OTHER PUBLICATIONS

Japanese Office Action with Translation dated Sep. 13, 2001.
(Continued)

*Primary Examiner* — Bernarr E Gregory
(74) *Attorney, Agent, or Firm* — Paradice and Li LLP

(57) ABSTRACT

Control and feature systems for processing signals from a satellite positioning system include an expert system receiver manager; a joint detection, carrier centring and bit sync acquisition subsystem; peak detection; a multi-dimensional measurement interpolation subsystem; a system for mode switching between a navigational signal; and power control module for receiver.

15 Claims, 24 Drawing Sheets

Related U.S. Application Data of application No. 10/570,578, filed as application No. PCT/US2004/028542 on Sep. 2, 2004, now Pat. No. 8,013,787.

(60) Provisional application No. 60/546,816, filed on Feb. 23, 2004, provisional application No. 60/547,385, filed on Feb. 23, 2004, provisional application No. 60/499,961, filed on Sep. 2, 2003.

(51) Int. Cl.
*H04B 1/707* (2011.01)
*G01S 19/24* (2010.01)
*G01S 19/34* (2010.01)
*G01S 19/00* (2010.01)

(52) U.S. Cl.
CPC ... *H04B 1/707* (2013.01); *H04B 2201/70715* (2013.01)

(58) Field of Classification Search
CPC ..... H04B 1/7073; H04B 1/7075; G01S 19/01; G01S 19/13; G01S 19/24; G01S 19/34; G01S 19/35; G01S 19/36; G01S 19/37; H04L 27/18; H04L 27/20; H04L 27/26; H04L 27/2601; H04L 27/2647; H04L 27/2655; H04L 27/2668; H04L 27/2673; H04L 27/2675; G01C 21/10; G01C 21/12; G01C 21/16; G01C 21/165
See application file for complete search history.

(56) References Cited

U.S. PATENT DOCUMENTS

| | | |
|---|---|---|
| 4,445,118 A | 4/1984 | Taylor |
| 4,463,357 A | 7/1984 | Macdoran |
| 4,578,678 A | 3/1986 | Hurd |
| 4,667,203 A | 5/1987 | Counselman |
| 4,701,934 A | 10/1987 | Jasper |
| 4,754,465 A | 6/1988 | Trimble |
| 4,785,463 A | 6/1988 | Janc |
| 4,809,005 A | 2/1989 | Counselman |
| 4,821,294 A | 2/1989 | Thomas, Jr. |
| 4,890,233 A | 12/1989 | Ando |
| 4,894,662 A | 1/1990 | Counselman |
| 4,947,477 A | 8/1990 | Little |
| 4,998,111 A | 3/1991 | Ma |
| 5,014,066 A | 5/1991 | Counselman |
| 5,036,329 A | 8/1991 | Ando |
| 5,043,736 A | 8/1991 | Darnell |
| 5,108,334 A | 4/1992 | Eschenbach |
| 5,202,829 A | 4/1993 | Geier |
| 5,225,842 A | 7/1993 | Brown |
| 5,257,195 A | 10/1993 | Hirata |
| 5,293,170 A | 3/1994 | Lorenz |
| 5,311,195 A | 5/1994 | Mathis |
| 5,323,164 A | 6/1994 | Endo |
| 5,343,209 A | 8/1994 | Sennott |
| 5,345,244 A | 9/1994 | Gildea |
| 5,347,284 A | 9/1994 | Volpi |
| 5,347,536 A | 9/1994 | Meehan |
| 5,365,450 A | 11/1994 | Schuchman et al. |
| 5,379,224 A | 1/1995 | Brown |
| 5,402,347 A | 3/1995 | Mcburney |
| 5,402,441 A | 3/1995 | Washizu |
| 5,416,712 A | 5/1995 | Geier et al. |
| 5,420,593 A | 5/1995 | Niles |
| 5,424,949 A | 6/1995 | Applegate et al. |
| 5,434,970 A | 7/1995 | Schiffleger |
| 5,440,313 A | 8/1995 | Osterdock |
| 5,450,344 A | 9/1995 | Woo |
| 5,483,549 A * | 1/1996 | Weinberg ............... H04L 27/20 375/151 |
| 5,504,684 A | 4/1996 | Lau |
| 5,535,278 A | 7/1996 | Cahn |
| 5,592,173 A | 1/1997 | Lau |
| 5,625,668 A | 4/1997 | Loomis |
| 5,650,785 A | 7/1997 | Rodal |
| 5,663,734 A | 9/1997 | Krasner |
| 5,663,735 A | 9/1997 | Eshenbach |
| 5,754,807 A | 5/1998 | Lambrecht et al. |
| 5,781,156 A | 7/1998 | Krasner |
| 5,786,789 A | 7/1998 | Janky |
| 5,809,261 A | 9/1998 | Lambrecht |
| 5,812,087 A | 9/1998 | Krasner |
| 5,825,327 A | 10/1998 | Krasner |
| 5,828,694 A | 10/1998 | Schippler |
| 5,831,570 A | 11/1998 | Ammar et al. |
| 5,831,574 A | 11/1998 | Krasner |
| 5,841,396 A | 11/1998 | Krasner |
| 5,845,203 A | 12/1998 | Ladue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | Ladue |
| 5,903,654 A | 5/1999 | Milton |
| 5,907,578 A | 5/1999 | Pon et al. |
| 5,907,809 A | 5/1999 | Molnar |
| 5,911,149 A | 6/1999 | Luan et al. |
| 5,917,444 A | 6/1999 | Loomis |
| 5,920,283 A | 7/1999 | Shaheen |
| 5,923,703 A | 7/1999 | Pon |
| 5,926,131 A | 7/1999 | Sakumoto |
| 5,936,572 A | 8/1999 | Loomis |
| 5,943,363 A | 8/1999 | Hanson |
| 5,945,944 A | 8/1999 | Krasner |
| 5,955,987 A | 9/1999 | Murphy et al. |
| 5,963,582 A | 10/1999 | Stansell |
| 5,966,403 A | 10/1999 | Pon |
| 5,977,909 A | 11/1999 | Harrison |
| 5,982,324 A | 11/1999 | Wafters |
| 5,983,332 A | 11/1999 | Watkins |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,006,309 A | 12/1999 | Shelly et al. |
| 6,009,551 A | 12/1999 | Sheynblat |
| 6,016,119 A | 1/2000 | Krasner |
| 6,041,222 A | 2/2000 | Horton |
| 6,040,798 A | 3/2000 | Kinal |
| 6,041,379 A | 3/2000 | Sher |
| 6,044,074 A | 3/2000 | Zehavi et al. |
| 6,044,452 A | 3/2000 | Birch et al. |
| 6,047,017 A | 4/2000 | Cahn |
| 6,052,081 A | 4/2000 | Krasner |
| 6,016,018 A | 5/2000 | Sheynblat |
| 6,061,018 A | 5/2000 | Sheynblat |
| 6,064,336 A | 5/2000 | Krasner |
| 6,069,915 A * | 5/2000 | Hulbert ............... H04B 1/7075 370/517 |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,121,923 A | 9/2000 | King |
| 6,131,067 A | 10/2000 | Girerd |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,178,195 B1 | 1/2001 | Durboraw, III |
| 6,184,822 B1 | 2/2001 | Fenton et al. |
| 6,185,427 B1 | 2/2001 | Krasner et al. |
| 6,208,290 B1 | 3/2001 | Krasner |
| 6,208,291 B1 | 3/2001 | Krasner |
| 6,215,441 B1 | 4/2001 | Moeglein et al. |
| 6,215,442 B1 | 4/2001 | Sheynblat et al. |
| 6,236,354 B1 | 5/2001 | Krasner |
| 6,239,742 B1 | 5/2001 | Krasner |

(56) References Cited

U.S. PATENT DOCUMENTS

| | | |
|---|---|---|
| 6,247,088 B1 | 6/2001 | Seo et al. |
| 6,252,542 B1 | 6/2001 | Ocamp |
| 6,259,399 B1 | 7/2001 | Krasner |
| 6,263,034 B1 | 7/2001 | Kanack et al. |
| 6,266,751 B1 | 7/2001 | Niescier |
| 6,272,430 B1 | 8/2001 | Krasner |
| 6,282,231 B1 | 8/2001 | Norman et al. |
| 6,289,041 B1 | 9/2001 | Krasner |
| 6,307,504 B1 | 10/2001 | Sheynblat |
| 6,313,786 B1 | 11/2001 | Sheynblat |
| 6,314,308 B1 | 11/2001 | Sheynblat et al. |
| 6,321,284 B1 | 11/2001 | Shinohara et al. |
| 6,327,473 B1 | 12/2001 | Soliman |
| 6,344,749 B1 | 2/2002 | Williams |
| 6,377,209 B1 | 4/2002 | Krasner |
| 6,389,291 B1 | 5/2002 | Pande |
| 6,408,196 B2 | 6/2002 | Sheynblat et al. |
| 6,411,254 B1 | 6/2002 | Moeglein et al. |
| 6,411,892 B1 | 6/2002 | Van |
| 6,414,987 B1 | 7/2002 | Pon |
| 6,417,801 B1 | 7/2002 | Van |
| 6,421,002 B2 | 7/2002 | Krasner |
| 6,421,696 B1 | 7/2002 | Horton |
| 6,429,814 B1 | 8/2002 | Van et al. |
| 6,433,731 B1 | 8/2002 | Sheynblat et al. |
| 6,448,925 B1 | 9/2002 | Shridhara |
| 6,453,237 B1 | 9/2002 | Fuchs et al. |
| 6,466,612 B2 | 10/2002 | Kohli |
| 6,480,529 B1 | 11/2002 | Sih et al. |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,516,021 B1 | 2/2003 | Abbott et al. |
| 6,526,322 B1 | 2/2003 | Peng et al. |
| 6,529,829 B2 | 3/2003 | Turetzky |
| 6,542,821 B2 | 4/2003 | Krasner |
| 6,577,271 B1 | 6/2003 | Gronemeyer |
| 6,583,757 B2 | 6/2003 | Krasner |
| 6,597,311 B2 | 7/2003 | Sheynblat et al. |
| 6,606,349 B1 | 8/2003 | Kudhrethaya et al. |
| 6,621,855 B1 | 9/2003 | Van Stralen et al. |
| 6,628,738 B1* | 9/2003 | Peeters ............... H04L 27/2675 375/226 |
| 6,633,255 B2 | 10/2003 | Krasner |
| 6,636,939 B1 | 10/2003 | George |
| 6,650,694 B1 | 11/2003 | Brown |
| 6,662,107 B2 | 12/2003 | Gronemeyer |
| 6,684,158 B1 | 1/2004 | Garin |
| 6,697,906 B1 | 2/2004 | Ayukawa et al. |
| 6,707,423 B2 | 3/2004 | Turetsky |
| 6,710,739 B1 | 3/2004 | Loegering |
| 6,728,822 B1 | 4/2004 | Sugawara et al. |
| 6,745,308 B2 | 6/2004 | Frank et al. |
| 6,765,931 B1 | 7/2004 | Rabenko et al. |
| 6,778,135 B2 | 8/2004 | Warloe et al. |
| 6,778,136 B2 | 8/2004 | Gronemeyer |
| 6,784,831 B1 | 8/2004 | Wang et al. |
| 6,788,655 B1 | 9/2004 | Underbrink |
| 6,807,241 B1* | 10/2004 | Milbar ............... H04L 27/2675 375/142 |
| 6,873,288 B2 | 3/2005 | Heppe |
| 6,912,612 B2 | 6/2005 | Kapur et al. |
| 6,965,974 B1 | 11/2005 | Bays et al. |
| 6,985,811 B2 | 1/2006 | Gronemeyer |
| 7,047,368 B2 | 5/2006 | Vantalon et al. |
| 7,051,139 B2 | 5/2006 | Peleg et al. |
| 7,076,609 B2 | 7/2006 | Garg et al. |
| 7,103,705 B2 | 9/2006 | Ku |
| 7,111,050 B2 | 9/2006 | McAdams |
| 7,116,704 B2 | 10/2006 | Norman et al. |
| 7,546,423 B2 | 6/2009 | Underbrink et al. |
| 7,639,180 B2 | 12/2009 | Falk et al. |
| 7,719,464 B2 | 5/2010 | Pande et al. |
| 7,792,650 B2 | 9/2010 | Underbrink et al. |
| 7,822,105 B2 | 10/2010 | Underbrink et al. |
| 8,013,787 B2 | 9/2011 | Chansarkar et al. |
| 8,065,461 B2 | 11/2011 | Laberge |
| 8,138,972 B2 | 3/2012 | Underbrink et al. |
| 8,164,517 B2 | 4/2012 | Zhang et al. |
| 8,321,636 B2 | 11/2012 | Vantalon et al. |
| 8,593,345 B2 | 11/2013 | Underbrink et al. |
| 8,810,450 B2 | 8/2014 | Zhang et al. |
| 8,947,300 B2 | 2/2015 | Chansarkar et al. |
| 2001/0042219 A1 | 11/2001 | Robertson |
| 2002/0012411 A1 | 1/2002 | Heinzl et al. |
| 2002/0025828 A1 | 2/2002 | Turetzky et al. |
| 2002/0038408 A1 | 3/2002 | Metayer et al. |
| 2002/0064209 A1 | 5/2002 | Turetzky |
| 2002/0102992 A1 | 8/2002 | Koorapaty et al. |
| 2002/0113734 A1 | 8/2002 | King |
| 2002/0142783 A1 | 10/2002 | Yoldi |
| 2003/0009283 A1* | 1/2003 | Pratt ............... G01C 21/165 701/483 |
| 2003/0046492 A1 | 3/2003 | Gschwind et al. |
| 2003/0088741 A1 | 5/2003 | Peng et al. |
| 2003/0091324 A1 | 5/2003 | Tominaga |
| 2003/0104818 A1 | 6/2003 | Kotzin |
| 2003/0108085 A1 | 6/2003 | Keller et al. |
| 2003/0122711 A1 | 7/2003 | Panasik et al. |
| 2003/0132878 A1 | 7/2003 | Devereux et al. |
| 2003/0134646 A1 | 7/2003 | Forrester |
| 2003/0147457 A1 | 8/2003 | King et al. |
| 2003/0154025 A1 | 8/2003 | Fuchs |
| 2003/0176204 A1 | 9/2003 | Abraham |
| 2004/0130484 A1 | 7/2004 | Krasner |
| 2004/0223570 A1 | 11/2004 | Adkisson |
| 2005/0018795 A1 | 1/2005 | Studenny et al. |
| 2005/0037724 A1 | 2/2005 | Walley et al. |
| 2005/0122260 A1 | 6/2005 | Dunas et al. |
| 2005/0131636 A1 | 6/2005 | Derambure et al. |
| 2006/0194562 A1 | 8/2006 | Marrah et al. |
| 2007/0046532 A1 | 3/2007 | Bucknor et al. |
| 2007/0132635 A1 | 6/2007 | Dockemeyer, Jr. et al. |
| 2012/0198181 A1 | 8/2012 | Das et al. |

FOREIGN PATENT DOCUMENTS

| | | |
|---|---|---|
| EP | 0884885 A2 | 12/1998 |
| GB | 2115195 | 9/1983 |
| GB | 2335554 | 9/1999 |
| JP | 58105632 | 6/1983 |
| JP | S6318448 A | 1/1988 |
| JP | H03214250 A | 9/1991 |
| JP | 4326079 | 11/1992 |
| JP | H05197617 A | 8/1993 |
| JP | 736035 | 2/1995 |
| JP | 200128551 | 1/2001 |
| JP | 200350272 | 2/2003 |
| WO | WO 199011652 | 10/1990 |
| WO | WO 200045191 | 8/2000 |
| WO | WO-0055992 A1 | 9/2000 |
| WO | WO 200204975 | 1/2002 |
| WO | WO 2003/003807 | 1/2003 |
| WO | WO-03060543 A2 | 7/2003 |
| WO | WO 2003098258 | 11/2003 |
| WO | WO-2005022187 A2 | 3/2005 |
| WO | WO-2005022300 A2 | 3/2005 |

OTHER PUBLICATIONS

Avagnina et al., "Definition of a Reconfigurable and Modular Multi-Standard Navigation Receiver", GPS Solutions, Springer Berlin, Apr. 2, 2003, pp. 33-40.

Harada et al., "A New Small-Size Multi-Mode and Multi-Task Software Radio Prototype for Future Intelligent Transport Systms", IEICE Transaction of Communications, Dec. 1, 2002, E85-B, No. 12, pp. 2703-2715.

Japanese Office Action with Translation dated Apr. 26, 2010.

Office Action for U.S. Appl. No. 10/570,833, filed Oct. 5, 2009, dated May 18, 2001.

Office Action for U.S. Appl. No. 13/400,390, filed Feb. 20, 2012, dated Jan. 31, 2013.

(56) References Cited

OTHER PUBLICATIONS

Office Action for U.S. Appl. No. 13/400,390, filed Feb. 20, 2012, dated Mar. 14, 2013.

EP Communication dated Oct. 26, 2010.

Soliman et al., gpa One: A hybrid position location system, 2000 IEEE, pp. 334-335.

Van Nee, D. J.R., Coenen, A.J.R.M., "Novel Fast GPS Code-Acquisition Using FFT," Electronic Letters, vol. 27, No. 2, pp. 158-160 (1991).

Van Nee, D.J.R., C oenen, A.J.R.M., "Novel Fast GPS/GLONASS Code Acquisition Technique Using Low Update Rate FFT," Electronic Letters, vol. 28, No. 9, pp. 863-865 (1992).

Office Action for U.S. Appl. No. 13/193,863, filed Jul. 29, 20111, dated May 8, 2014.

Davarian F, "Sirius Satellite Radio: Radio entertainment in the sky," IEEE Aerospace Conference Proceedings, vol. 3, p. 3-1031 to 3-1038, 2002.

Karaliopoulos M., et al., "Satellite radio interface and radio resource management strategy for the delivery of multicast/broadcast services via an integrated satellite-terrestrial system," IEEE Communications Magazine, Sep. 2004, vol. 42(9), p. 108-117.

Marketing Material: Global Locate—Hammerhead II.TM., Single Chip AGPS Solution, 2 pages, year 2007.

Marketing Material: Qualcomm CDMA Technologies—Integrated Solutions—MGP6200.TM.Multimode GPS Processor,Jun. 27, 2002, 8 pages.

Marketing Material: uNav Microelectroncis—uN9x18 Low Power, High Performance GPS Receiver Chipset/uN9x18 GPS Receiver Solution, 9 pages, year 2006.

Marketing Material: uNav Microelectronics, uN9x18 Low Power, High Performance GPS Receiver Chipset, 2 pages.

Marketing Material/Press Release: Broadcom Introduces Advanced Single-Chip GPS Solution for Mobile Applications, Oct. 5, 2007, 3 pages.

Marketing Material/White Paper: SnapTrack: A Qualcomm Company—SnapTrack's Wireless Assisted GPS.TM. (A-GPS) Solution Provides the Industry's Best Location System—Location Technologies for GSM, GPRS and WCDMA Networks (Qualcomm CDMA Technologies: Enabling the Future of Communications) 4 pages.

\* cited by examiner

1900

1902 — 1) SS2 and SS3 processed channels may not lap each other

1904 — 2) SS2 may not enter a channel (make active) if SS3 is currently active with that channel
- SS2 has "lapped" SS3 condition 1906 — 3) SS3 may not exit a channel if SS2 is currently active with that channel
- SS3 is following on the heels of SS2 condition 1908 — SS3 will process data as it becomes available if SS2 is active 1910 — 4) SS2 will process the number of msec it has been programmed to process (including SW correction portion)
- will remain in channel until completes processing 1912 — 5) SS3 will process as many T1's as are available in its buffer
- up to stored SS2 buffer pointers if SS2 is not active
- up to point where SS2 completes if SS2 is active 6) SS2 and SS3 may be prevented from continuing processing by pause semaphore or pause flag
- SS2 may be stalled by SS3 context done or by SS3 pdi done
- SS3 may be stalled by a SS3 pdi done

FIG. 19

Semaphore and Interrupt Structure

CONTROL AND FEATURES FOR SATELLITE POSITIONING SYSTEM RECEIVERS

1. RELATED APPLICATIONS

This application is a divisional of application Ser. No. 13/193,863, filed Jul. 29, 2011, entitled CONTROL AND FEATURES FOR SATELLITE POSITIONING SYSTEM RECEIVERS, which is a divisional of application Ser. No. 10/570,578, filed Aug. 25, 2008, entitled CONTROL AND FEATURES FOR SATELLITE POSITIONING RECEIVERS, which claims priority under 35 U.S.C. § 119(e) of U.S. Provisional Application No. 60/499,961, filed on Sep. 2, 2003 and titled "GPS SYSTEM", which application is incorporated by reference herein.

U.S. Provisional Patent Application No. 60/546,816, filed on Feb. 23, 2004, entitled "CONTROL AND FEATURES FOR SATELLITE POSITIONING SYSTEM RECEIVERS", by Mangesh Chansarkar, Sundar Raman, James Brown, Robert Harvey, Peter Michali, Bill Higgins, Paul Underbrink, Henry Falk, Charles Norman, for which a claim to priority is made and is incorporated by reference herein.

PCT Patent Application No. PCT/US04/28542, filed on Sep. 2, 2004, which is incorporated by reference herein.

U.S. Provisional Patent Application entitled SIGNAL PROCESSING SYSTEM FOR SATELLITE POSITIONING SIGNALS, filed Feb. 23, 2004, Ser. No. 60/547,384, for which a claim to priority is made and is incorporated by reference herein.

This application is also related to the following:

U.S. patent application Ser. No. 10/696,522, filed on Oct. 28, 2003 now U.S. Pat. No. 7,047,368 and titled "MEMORY REALLOCATION AND SHARING IN ELECTRONIC SYSTEMS", by Nicolas P. Vantalon, Steven A. Gronemeyer and Vojislav Protic, for which a claim to priority is made and is incorporated by reference herein.

U.S. Pat. No. 5,901,171, filed on Apr. 25, 1996 now U.S. patent Ser. No. 08/638,021, and titled "TRIPLE MULTIPLEXING SPREAD SPECTRUM RECEIVER", by Sanjai Kohli and Steven Chen, which is incorporated by reference herein.

Additional patents that are incorporated by reference and/or claimed to for priority: U.S. patent Applications, all of which are currently pending Ser. No. 09/498,893, Filed on Feb. 7, 2000, now U.S. Pat. No. 7,545,854, as a CIP of U.S. Pat. No. 6,044,105 that was originally filed on Sep. 1, 1998 as U.S. application Ser. Nos. 09/145,055; 09/604,595, filed on Jun. 27, 2000, now U.S. Pat. No. 7,711,038, as a CIP of Ser. No. 09/498,893, filed on Feb. 7, 2000, now U.S. Pat. No. 7,545,854, as a CIP of U.S. Pat. No. 6,044,105 that was originally filed on Sep. 1, 1998 as U.S. application Ser. Nos. 09/145,055; Ser. No. 10/369,853, filed on Feb. 20, 2003, now U.S. Pat. No. 8,144,810; Ser. No. 10/632,051 filed on Jul. 30, 2003, now U.S. Pat. No. 8,903,348, as a CIP of Ser. No. 10/369,853 that was filed on Feb. 20, 2003, now U.S. Pat. No. 8,144,810; Ser. No. 10/712,789, filed Nov. 12, 2003, now U.S. Pat. No. 7,183,972, titled "COMMUNICATION SYSTEM THAT REDUCES AUTO-CORRELATION or CROSS-CORRELATION IN WEAK SIGNALS," by Gregory B. Turestsky, Charles Norman and Henry Falk, which claims priority to U.S. Pat. No. 6,680,695, filed on Jul. 20, 2001 as U.S. application Ser. No. 09/910,404, and issued on Jan. 20, 2004, by Gregory B, Turestsky, Charles Norman and Henry Falk, which claimed priority to U.S. Provisional Patent Application Ser. No. 60/227,674, filed on Aug. 24, 2000, titled "METHOD AND APPARATUS FOR ELIMINATING AUTO-CORRELATIONS OR CROSS-CORRELATIONS IN WEAK CDMA SIGNALS" by Gregory B. Turestsky, Charles Norman and Henry Falk; U.S. patent application Ser. No. 10/775,870, filed on Feb. 10, 2004, now U.S. Pat. No. 7,026,986, titled "LOCATION SERVICES SYSTEM THAT REDUCES AUTO-CORRELATION OR CROSS-CORRELATION IN WEAK SIGNALS," by Gregory B. Turestsky, Charles Norman and Henry Falk, which claims priority to U.S. patent application Ser. No. 10/244,293, filed Sep. 16, 2002, now U.S. Pat. No. 6,707,423, titled "LOCATION SERVICES THAT REDUCES AUTO-CORRELATION OR CROSS-CORRELATION IN WEAK SIGNALS," by Gregory B. Turestsky, Charles Norman and Henry Falk, which claims priority to U.S. Pat. No. 6,466,161, filed on Jul. 20, 2001 as U.S. application Ser. No. 09/910,091, titled "LOCATION SERVICES THAT REDUCES AUTO-CORRELATION OR CROSS-CORRELATION IN WEAK SIGNALS," by Gregory B. Turestsky, Charles Norman and Henry Falk, which claimed priority to U.S. Provisional Patent Application Ser. No. 60/227,674, filed on Aug. 24, 2000, titled "METHOD AND APPARATUS FOR ELIMINATING AUTO-CORRELATIONS OR CROSS-CORRELATIONS IN WEAK CDMA SIGNALS" by Gregory B. Turestsky, Charles Norman and Henry Falk; Ser. No. 10/194,627, Filed Jul. 12, 2002, now U.S. Pat. No. 7,577,448, and titled MULTI-MODE GPS FOR USE WITH WIRELESS NETWORKS, by Ashutosh Pande, Lionel J. Garin, Kanwar Chadha & Gregory B. G Turestsky, that continuation of Ser. No. 10/068,751, filed Feb. 5, 2002, now U.S. Pat. No. 6,519,466, that was a continuation of U.S. Pat. No. 6,389,291, filed on Feb. 8, 2001 as U.S. application Ser. No. 09/781,068, that claimed priority to U.S. Provisional Patent Application 60/255,076, Filed on Aug. 14, 2000; Ser. No. 10/385,198, filed on Mar. 10, 2002, now U.S. Pat. No. 6,915,208, as a Continuation of U.S. Pat. No. 6,542,823, filed on Apr. 19, 2002 as U.S. application Ser. No. 10/127,229, that was continuation of U.S. Pat. No. 6,427,120, filed Feb. 28, 2001 as U.S. application Ser. No. 09/795,871, and claimed priority to U.S. Provisional Patent Application 60/255,076, filed on Aug. 14, 2000.

U.S. Patent Applications, all of which are currently pending Ser. No. 10/155,614, filed May 22, 2002, now U.S. Pat. No. 6,684,158; Ser. No. 09/910,092, filed Jul. 20, 2001, now U.S. Pat. No. 7,197,305; Ser. No. 09/910,404, filed Jul. 20, 2001, now U.S. Pat. No. 6,680,695; Ser. No. 09/909,716, filed Jul. 20, 2001, now U.S. Pat. No. 7,106,786; Ser. No. 10/244,293, filed Sep. 16, 2002, now U.S. Pat. No. 6,707,423; Ser. No. 10/712,789, filed Nov. 12, 2003, now U.S. Pat. No. 7,183,972; Ser. No. 10/666,551, filed Sep. 18, 2003, now U.S. Pat. No. 7,239,271; Ser. No. 09/551,047, filed Apr. 18, 2000, now U.S. Pat. No. 6,850,557; Ser. No. 09/551,276, filed Apr. 18, 2000, now U.S. Pat. No. 6,931,055; Ser. No. 09/551,802, filed Apr. 18, 2000, now U.S. Pat. No. 6,952,440; Ser. No. 09/552,469, filed Apr. 18, 2000, now U.S. Pat. No. 6,788,655; Ser. No. 09/552,759, filed Apr. 18, 2000, now U.S. Pat. No. 6,714,158; Ser. No. 09/732,956, filed Dec. 7, 2000, now U.S. Pat. No. 6,675,003; Ser. No. 09/735,249, filed Dec. 11, 2000, now U.S. Pat. No. 6,917,644; Ser. No. 09/886,427, filed Jun. 20, 2001, now U.S. Pat. No. 7,127,351; Ser. No. 10/099,497 filed Mar. 13, 2002, now U.S. Pat. No. 7,220,262; Ser. No. 10/101,138 filed Mar. 18, 2002, now U.S. Pat. No. 6,748,015; Ser. No. 10/246,584, filed Sep. 18, 2002, now U.S. Pat. No. 6,760,364; Ser. No. 10/263,333, filed Oct. 2, 2002, now U.S. Pat. No. 7,148,844; Ser. No. 10/309,647, filed Dec. 4, 2002, now U.S. Pat. No. 6,930,634; Ser. No. 10/320,932, filed Dec. 16, 2002, now U.S. Pat. No.

6,788,735; Ser. No. 10/412,146, filed Apr. 11, 2003, now U.S. Pat. No. 6,853,338; Ser. No. 10/423,137, filed Apr. 25, 2003, now U.S. Pat. No. 6,917,331; Ser. No. 10/600,174, filed Jun. 20, 2003, now U.S. Pat. No. 6,985,811; Ser. No. 10/600,190, filed Jun. 20, 2003, now U.S. Pat. No. 8,457,876; Ser. No. 10/644,311, filed Aug. 19, 2003, now U.S. Pat. No. 7,002,516; Ser. No. 10/658,185, filed Sep. 9, 2003, now U.S. Pat. No. 7,082,292; Ser. No. 10/696,522, filed Oct. 28, 2003, now U.S. Pat. No. 7,047,368; Ser. No. 10/706,167, filed Nov. 12, 2003, now U.S. Pat. No. 7,116,704; Ser. No. 10/715,656, filed Nov. 18, 2003, now U.S. Pat. No. 7,035,613; Ser. No. 10/722,694, filed Nov. 24, 2003, now U.S. Pat. No. 7,406,114; and Ser. No. 10/762,852, filed Jan. 22, 2004, now U.S. Pat. No. 7,639,180; and the application entitled SIGNAL PROCESSING SYSTEM FOR SATELLITE POSITIONING SIGNALS, filed Feb. 23, 2001 Ser. No. 60/517,381.

2. FIELD OF THE INVENTION

This invention relates generally to positioning systems. More specifically, this invention relates to methods and systems for implementing control and features in a satellite positioning system.

3. RELATED ART

The worldwide utilization of wireless devices such as two-way radios, pagers, portable televisions, personal communication systems ("PCS"), personal digital assistants ("PDAs") cellular telephones (also known a "mobile phones"), Bluetooth enabled devices, satellite radio receivers and Satellite Positioning Systems ("SPS") such as the United States' Global Positioning Systems ("GPS"), also known as NAVSTAR, is growing at a rapid pace. Current trends are calling for the incorporation of SPS services into a broad range of electronic devices and systems, including Personal Digital Assistants (PDAs), cellular telephones, portable computers, automobiles, and the like. Manufacturers constantly strive to reduce costs and produce the most cost-attractive product possible for consumers.

At the same time, the manufacturers attempt to provide a product as rich in features, and as robust and reliable, as possible. To a certain extent, technology and available development time place constraints on what features may be implemented in any given device. Thus, in the past, prior SPS devices have experienced drawbacks and limitations in areas that include, as examples, receiver managers, signal measurements, bit synchronization techniques, integrity monitoring, operational mode switching, measurement interpolation, hardware and software satellite signal tracking loops, and power control. Such drawbacks limit the performance, ease of use and robustness of the GPS enabled electronic devices, in addition to having an impact on sales and consumer desirability.

Therefore, there is a need for overcoming the problems noted above, and other previously experienced.

SPS receiver functionality may reside in a device that has additional functionality, such as, for example, wireless communication devices, tracking devices, and emergency location beacons. The SPS functionality in the device may include multiple subsystems that initialize, control and monitor the operation of the SPS functionality. Subsystems in turn may be made up of a number of software modules and hardware components/circuits that accomplish a desired SPS purpose. The subsystems may include an input sample subsystem, signal processing subsystem, FFT subsystem, memory subsystem, sequencer subsystem, and other miscellaneous subsystems. The subsystems may work together to implement location determination, power control, and configuration of the SPS receiver functionality, communication between subsystems, and communication with the additional functionality. An example of implemented SPS receiver functionality is a GPS receiver and the terms SAS and GPS may be used interchangeably.

The software aspects of the SPS receiver functionality may be implemented in software as groupings of machine instructions that are stored in machine-readable devices, such as, for example, types of ROM (i.e. PROMS, EPROMS, ASICs and within controllers), magnetic storage (hard/floppy disks), and optical storage (CDs, DVDs, LaserDisc). When the machine instructions are executed, the control and features of the GPS receiver are achieved.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

The components in the figures are not necessarily to scale, emphasis instead being placed upon illustrating the principles of the invention. In the figures, like reference numerals designate corresponding parts throughout the different views.

Figure 5:
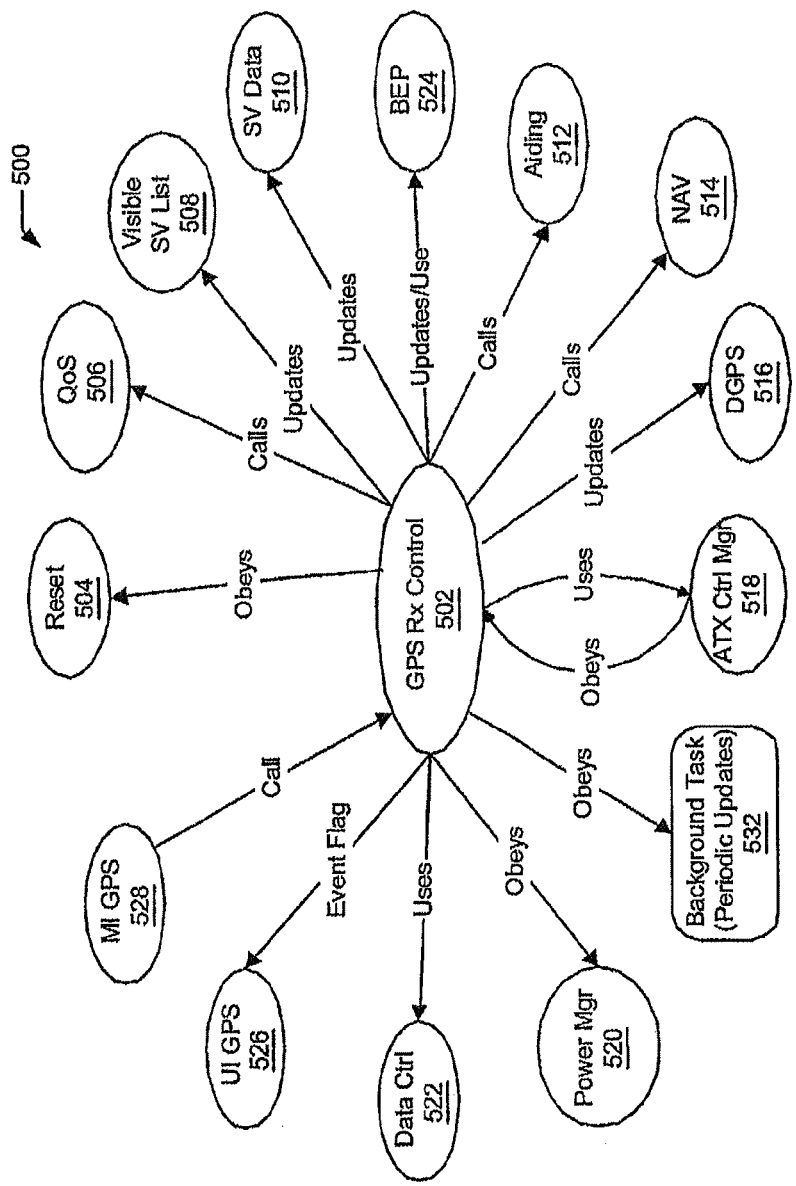
FIG. 5 is a module interaction diagram of the GPS receiver of FIG. 1.
Figure 13:
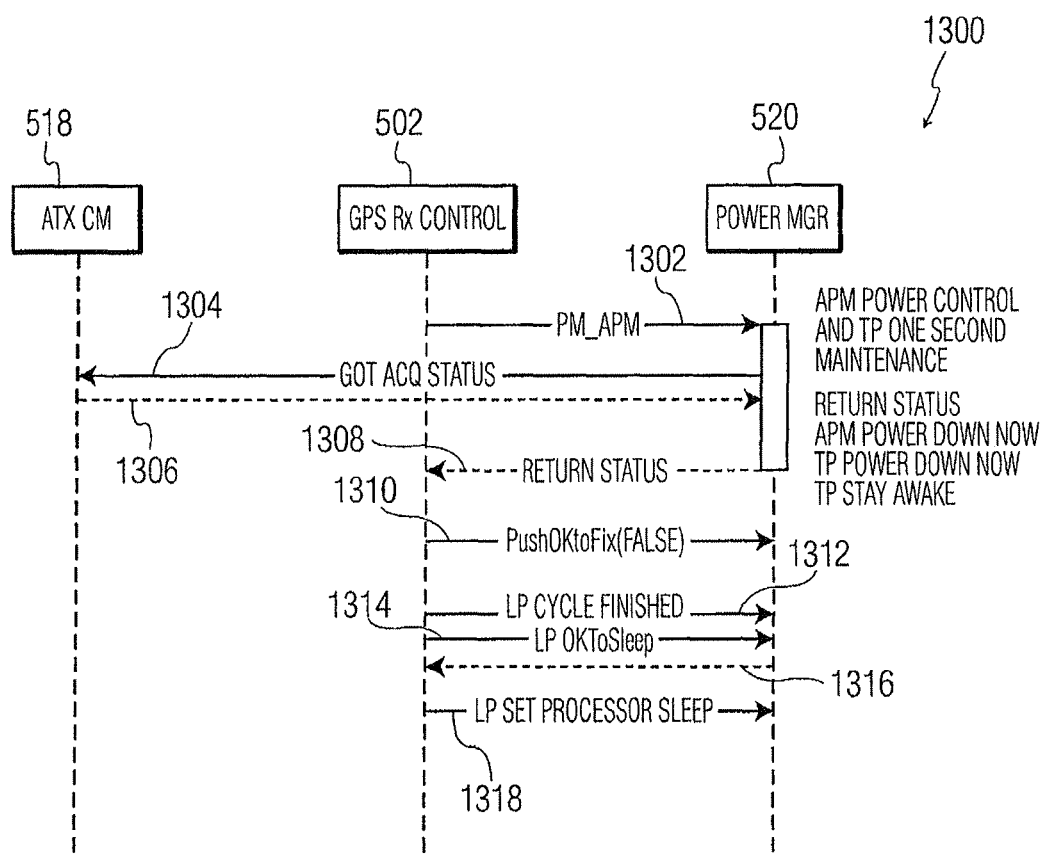

FIG. 13, a sequence drawing of power management via the power manager module of FIG. 5.

Figure 14:
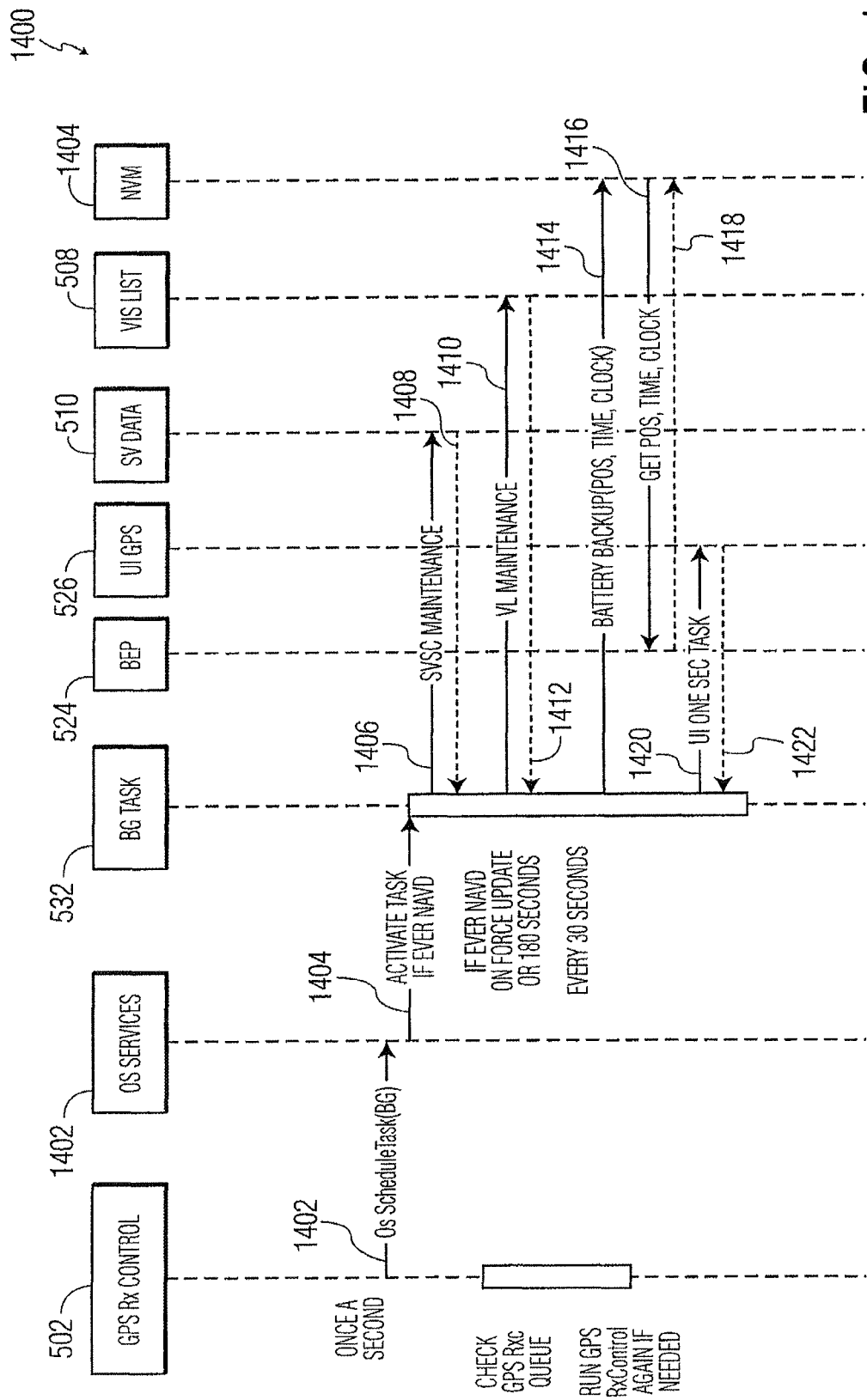

FIG. 14 is a sequence drawing of the background task module of FIG. 5.

Figure 2:
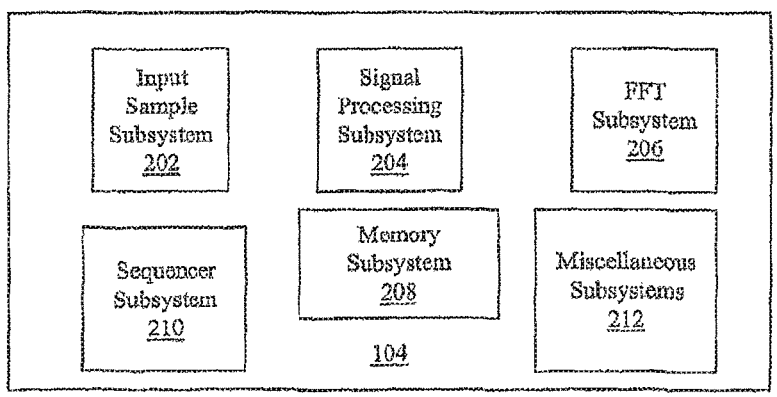
FIG. 2 is a block diagram showing subsystems of a baseband chip from the GPS receiver of FIG. 1.
Figure 15:
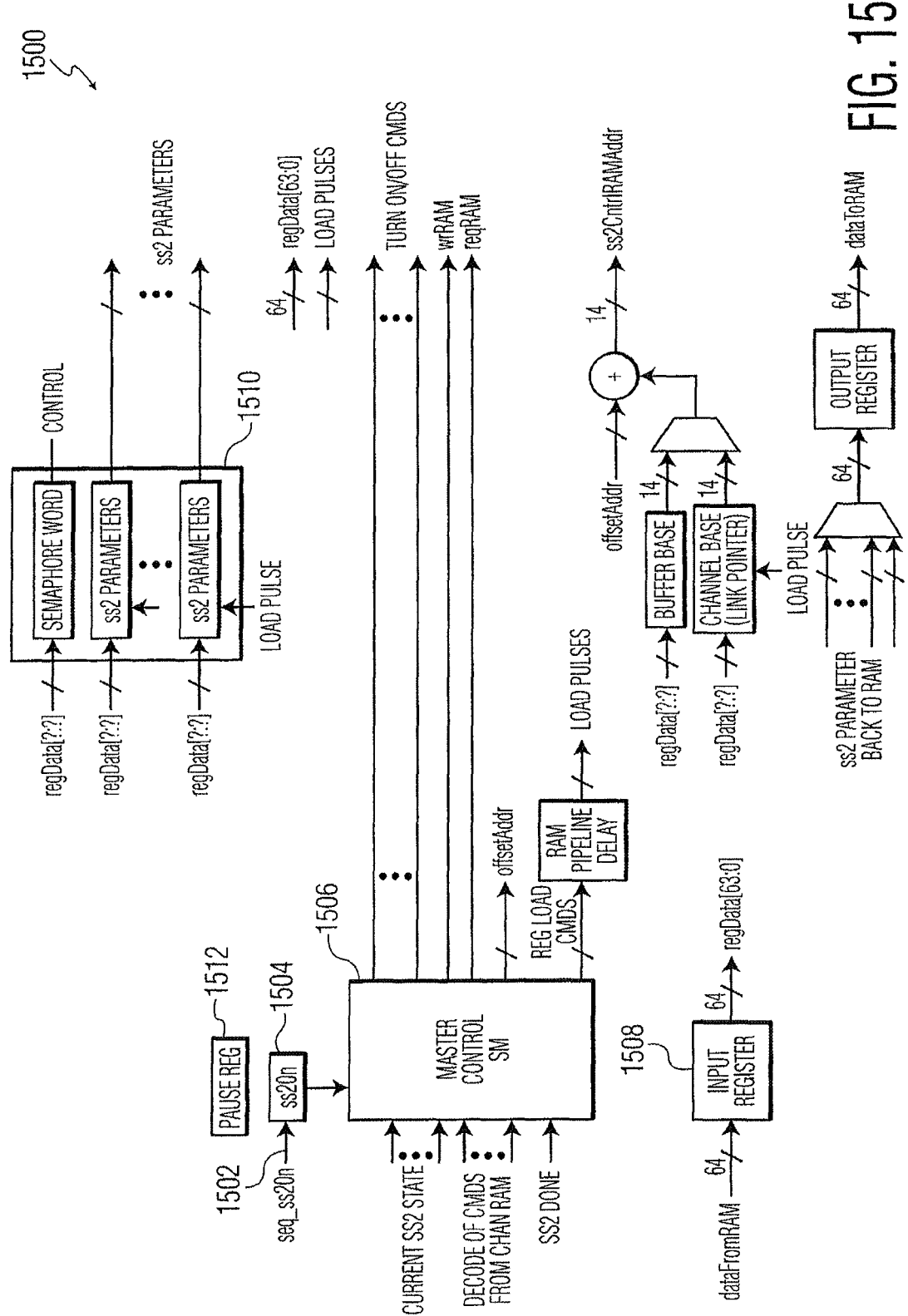

FIG. 15 is a flow diagram of the signal processing subsystem of FIG. 2.

Figure 16:
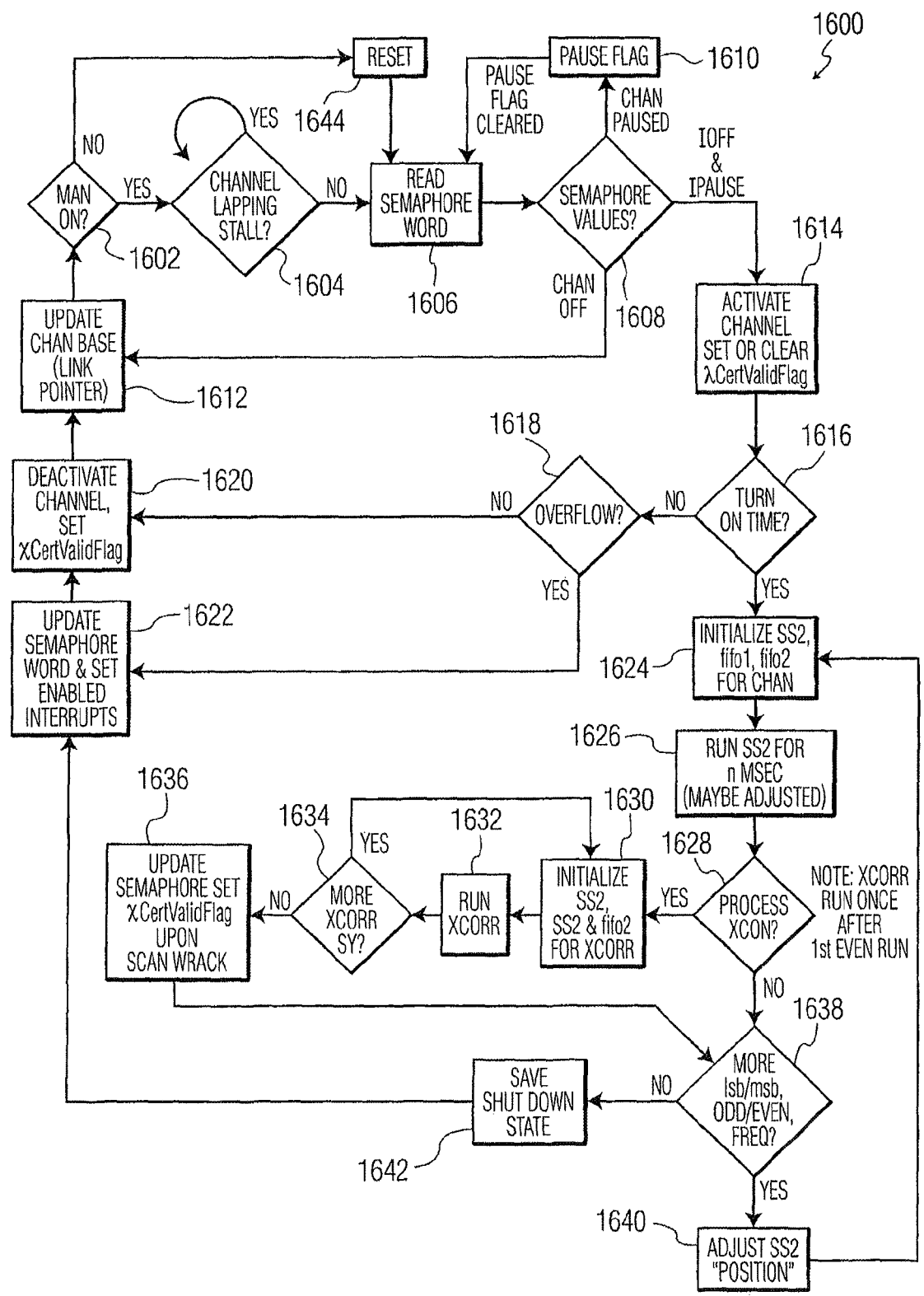

FIG. 16 is an illustration of the master control state machine of FIG. 15.

Figure 17:
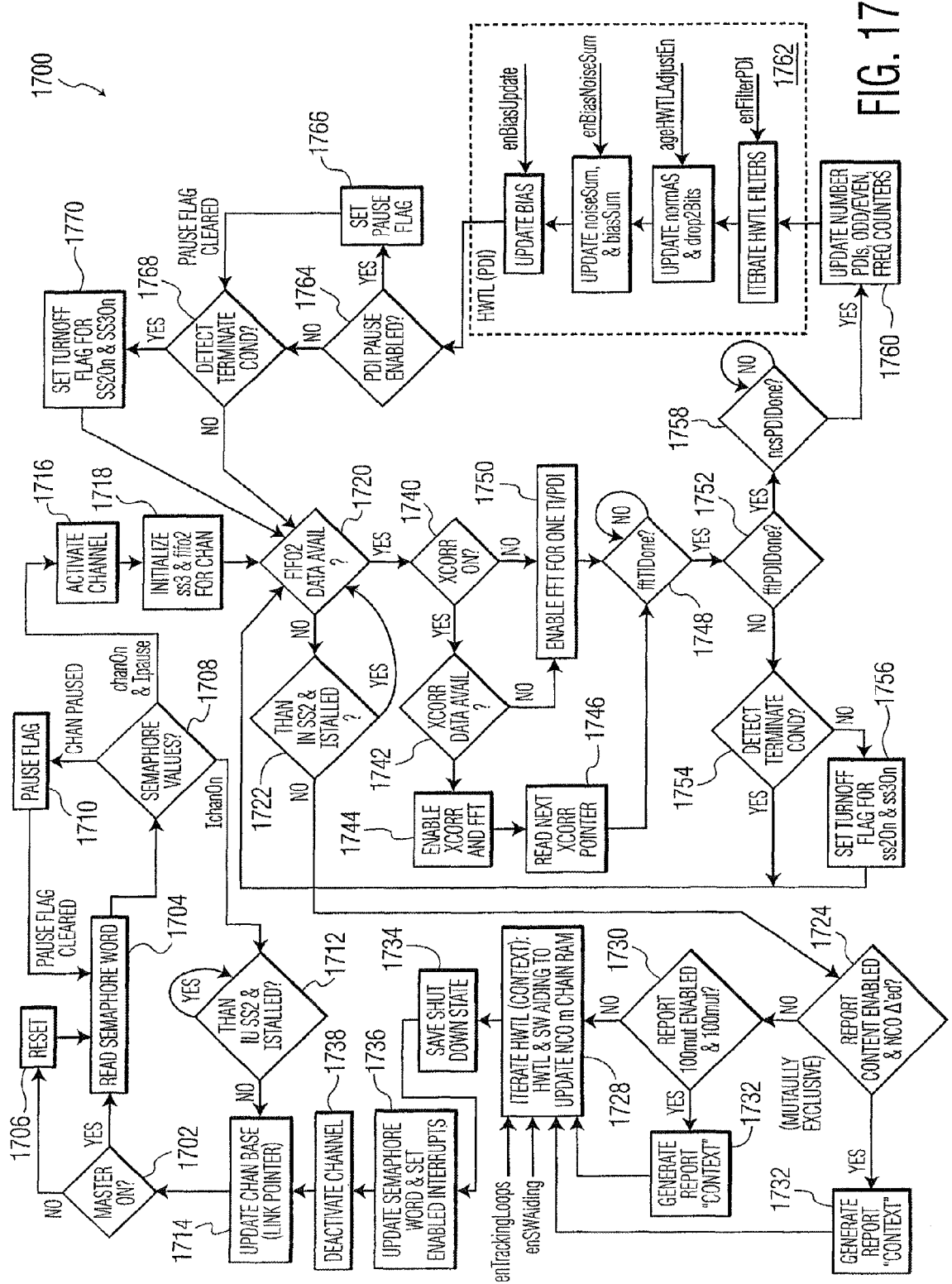

FIG. 17 is an illustration of the master control state machine for the FFT subsystem of FIG. 2.

Figure 18:
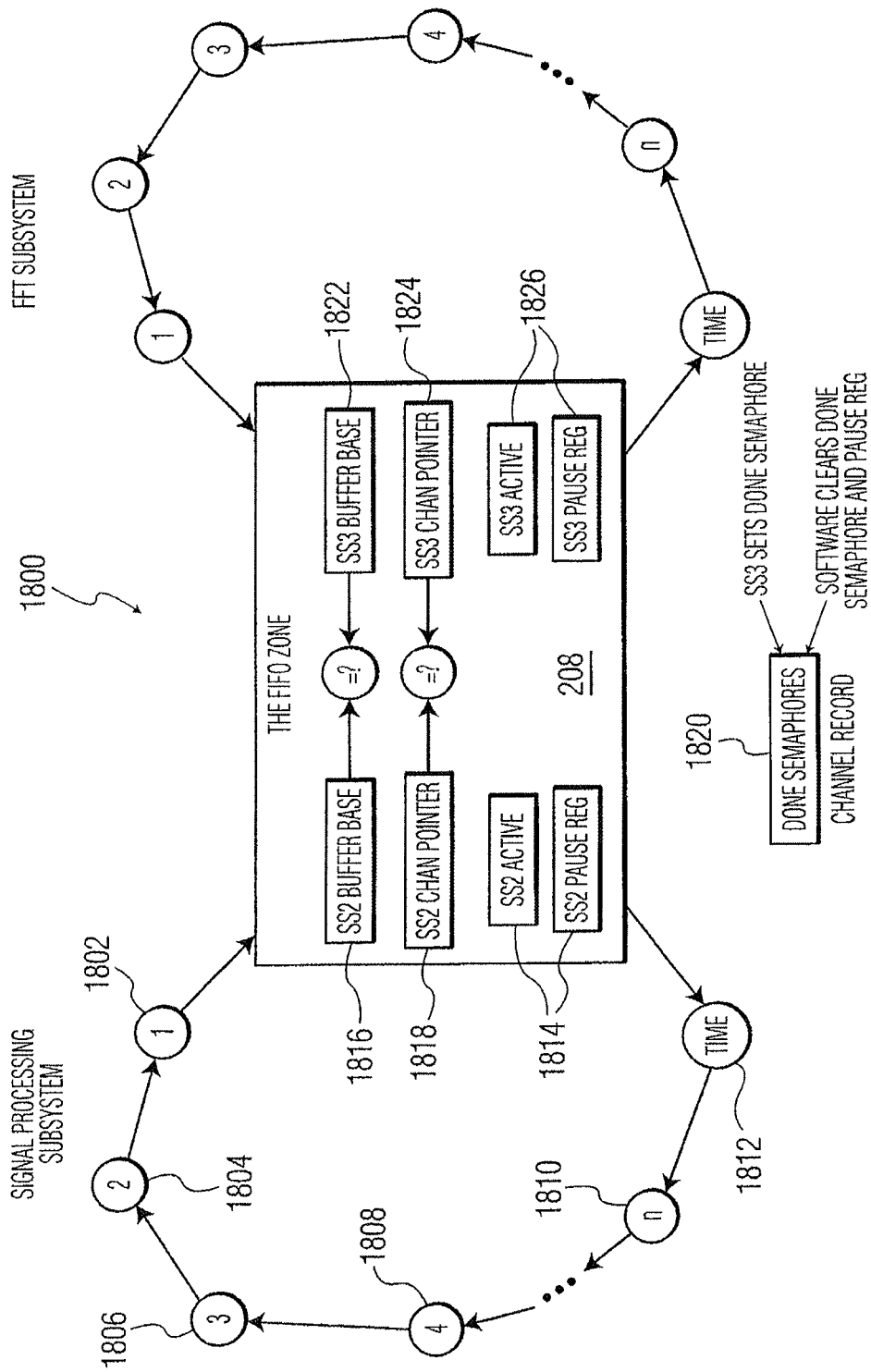

FIG. 18 is a channel sequencing control diagram illustrating the communication between the signal processing subsystem and the FFT subsystem using the memory subsystem.

FIG. 19 is a list of lapping rules to prevent the signal processing subsystem from overwriting memory used by the FFT subsystems of FIG. 18.

Figure 20:
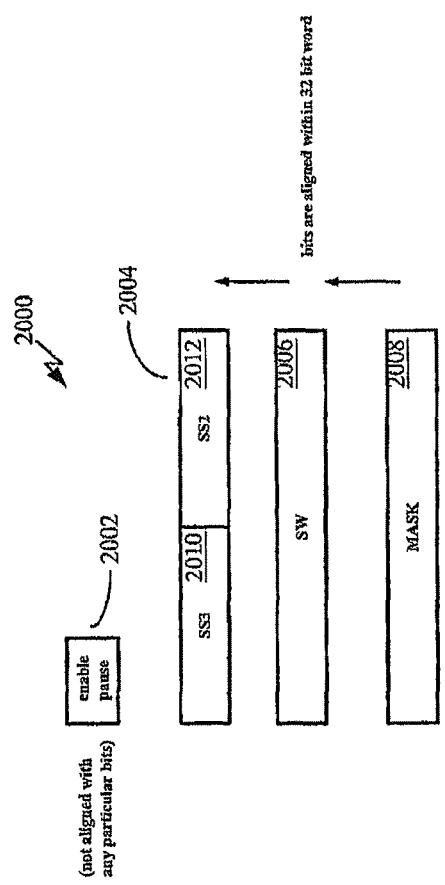

FIG. 20 is an illustration of the semaphore and interrupt structure for communication between the subsystems of FIG. 2, software and hardware.

Figure 21:
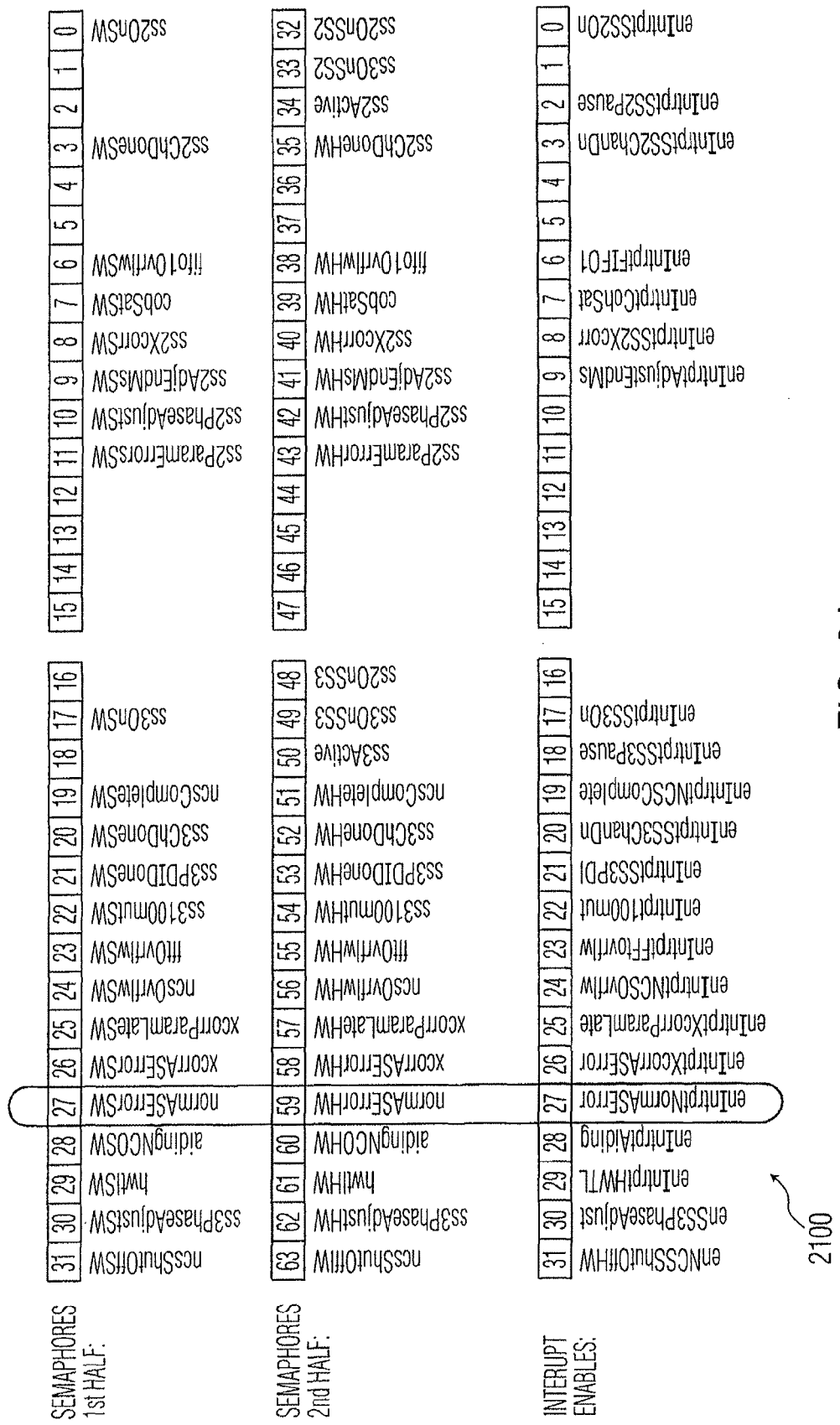

FIG. 21 is a bit level illustration of the semaphore and interrupt mask of the interrupt structure of FIG. 20.

Figure 22:
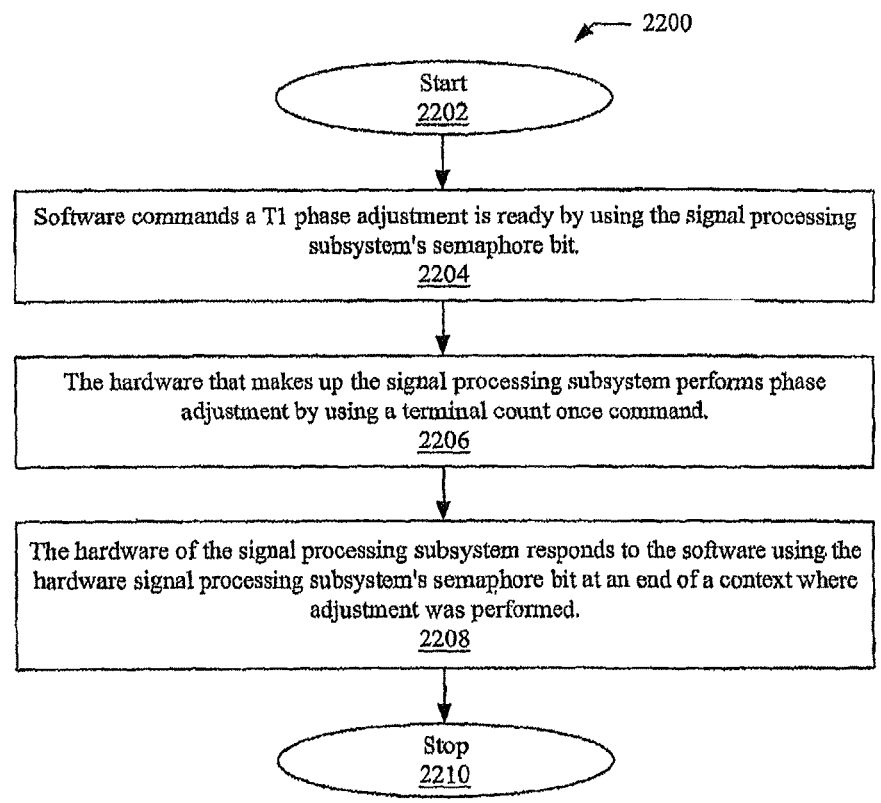

FIG. 22 is a flow diagram of time adjustment of the signal processing subsystem of FIG. 2 within a T1 phase.

Figure 3:
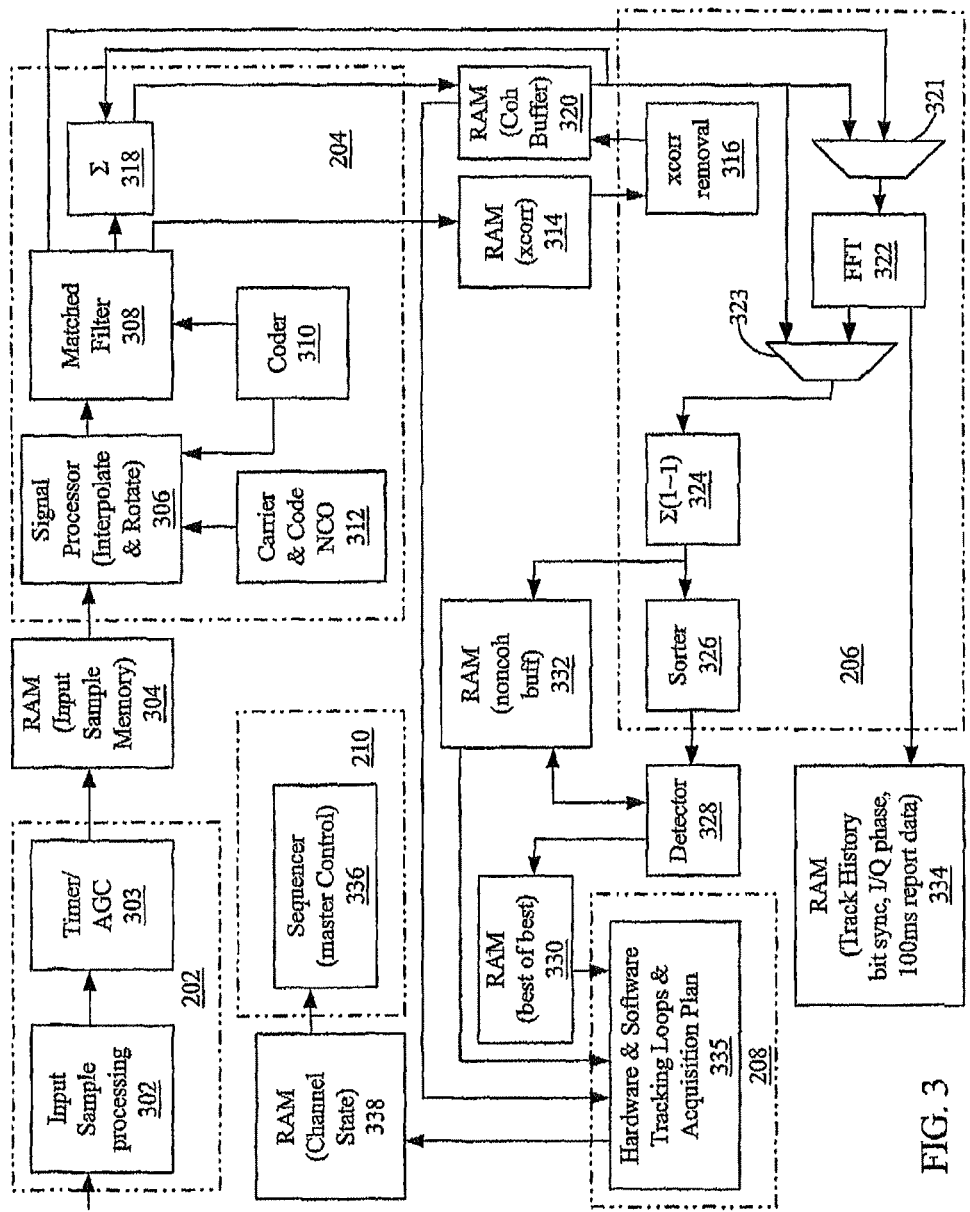
FIG. 3 is a block diagram illustrating general data flow between subsystems of the GPS receiver of FIG. 1.
Figure 23:
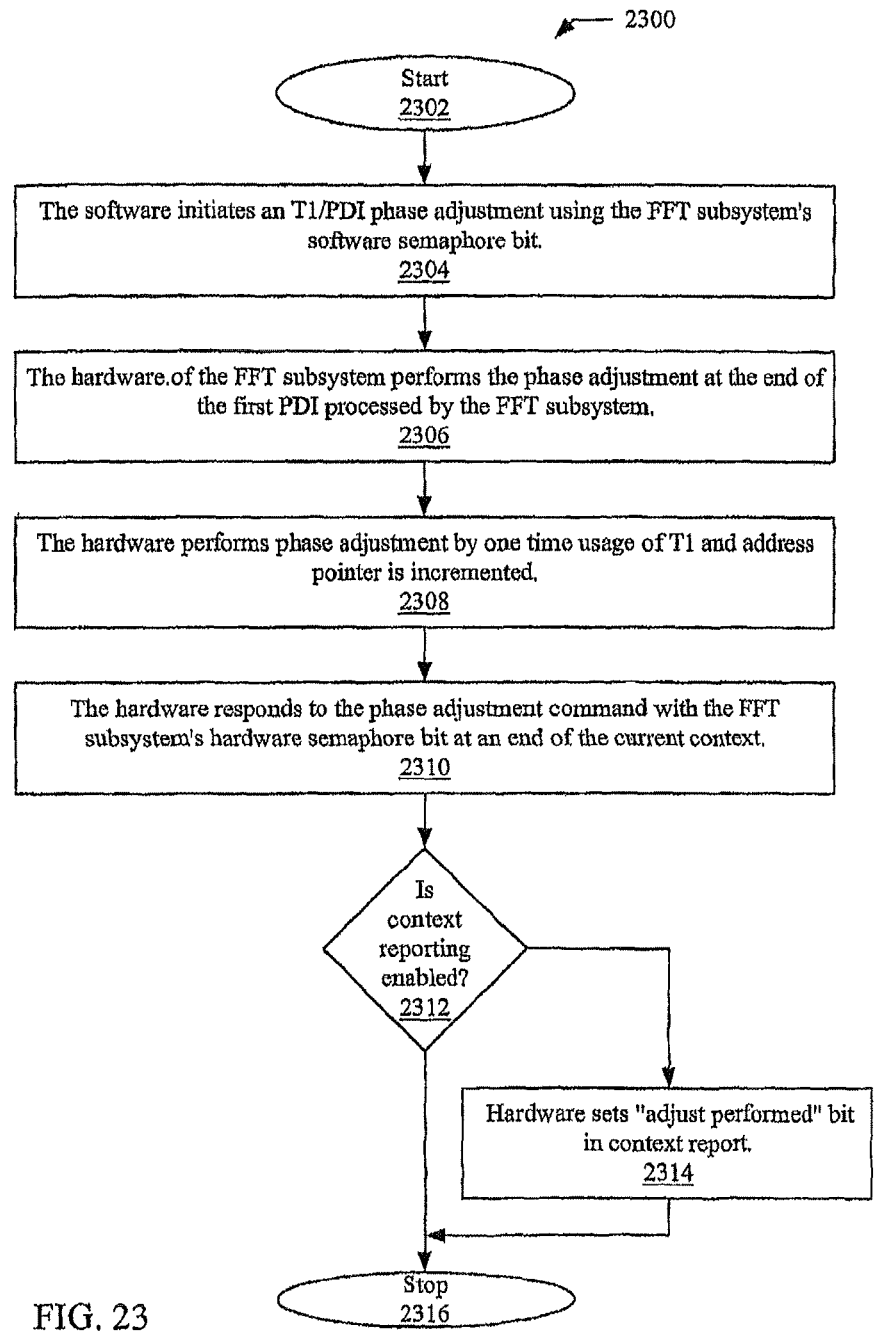
Figure 24:
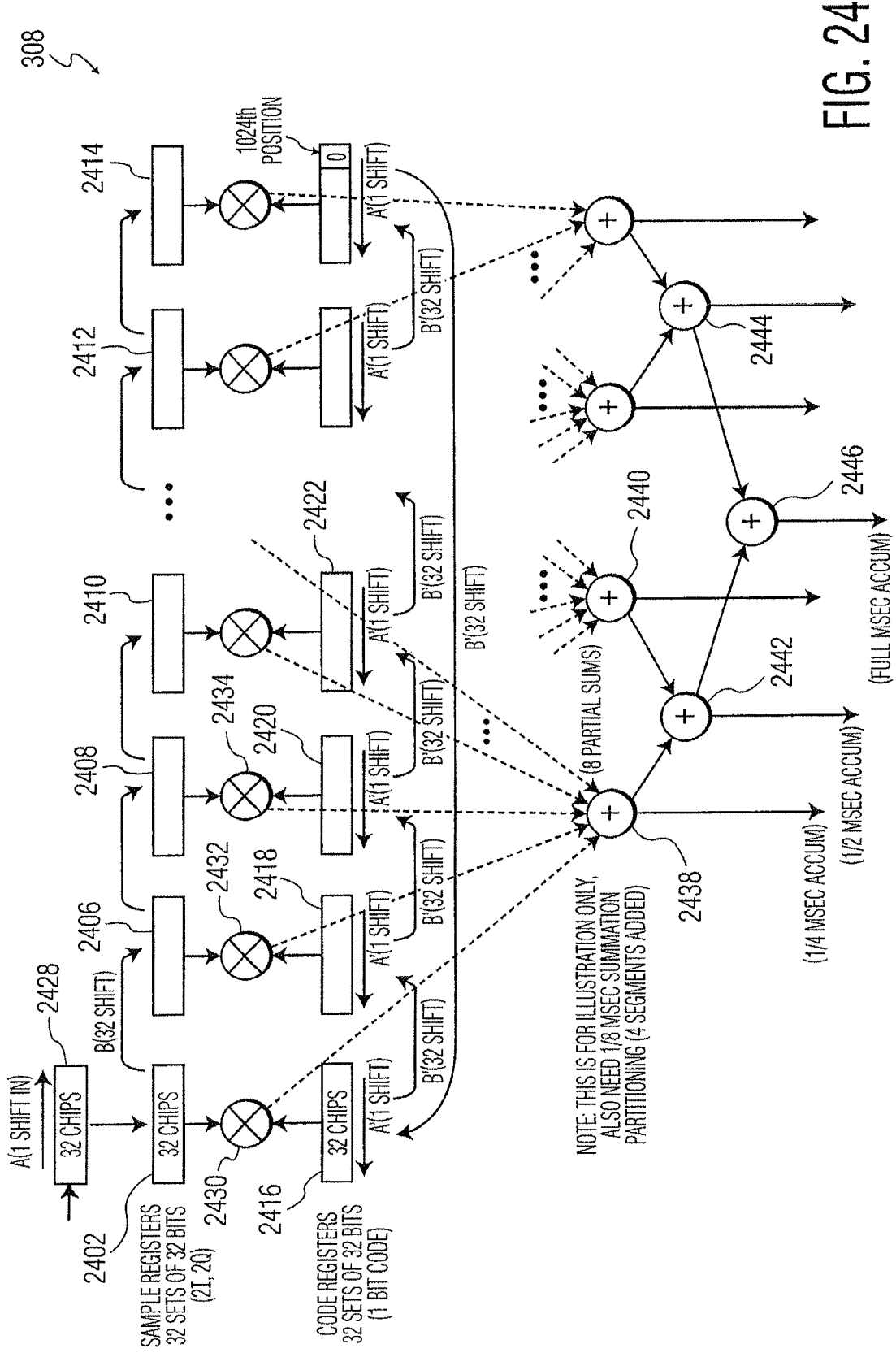
Figure 25:
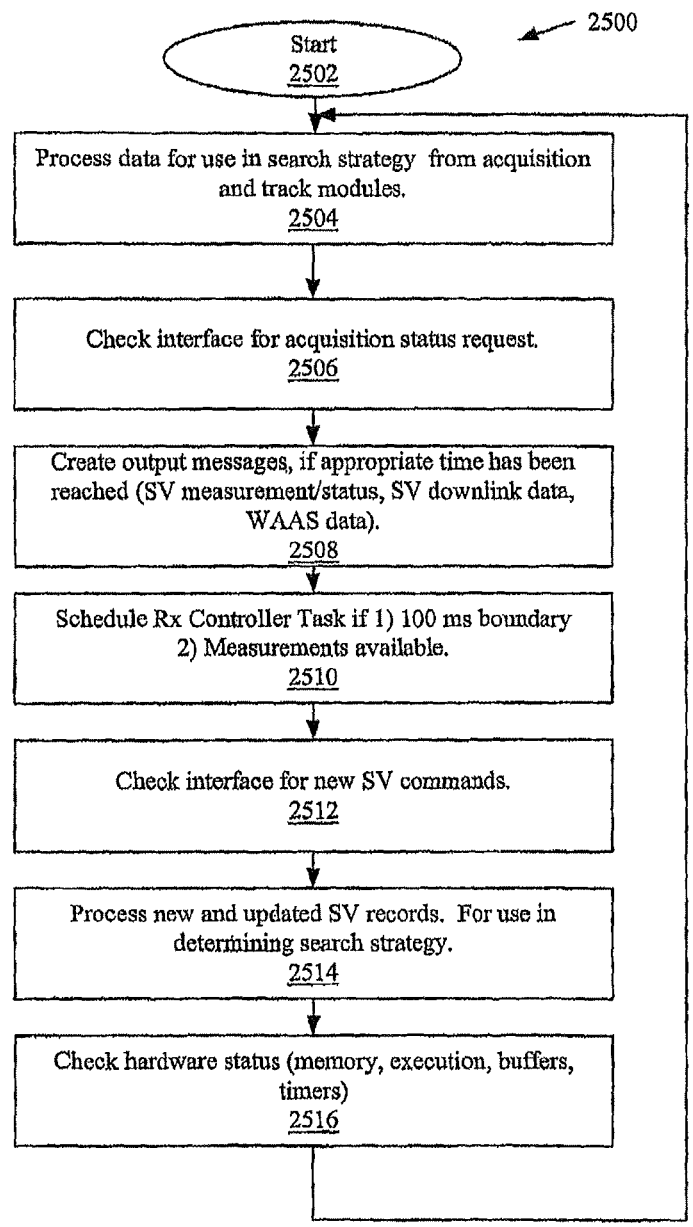

FIG. 23 is a flow diagram of the time adjustment of the FFT subsystem of FIG. 2 within a T1 phase FIG. 24 is a diagram of the match filter of FIG. 3 that is configurable by software FIG. 25 is a flow diagram of an expert GPS control system that resides in the GPS receiver controller of FIG. 5.

The discussion below is directed to a hardware and software architecture that provides control and features in a satellite positioning systems (SPS), such as the United States Global Positioning Satellite System commonly referred to as a GPS system. Specific features of the architecture include, as examples; SPS initialization of memory; control of data processing; subsystem communication; power control management, and an expert system receiver manager. The architecture and the control and feature systems described below are not limited to the precise implementations described, but may vary from system to system according to the particular needs or design constraints of those systems.

Figure 1:
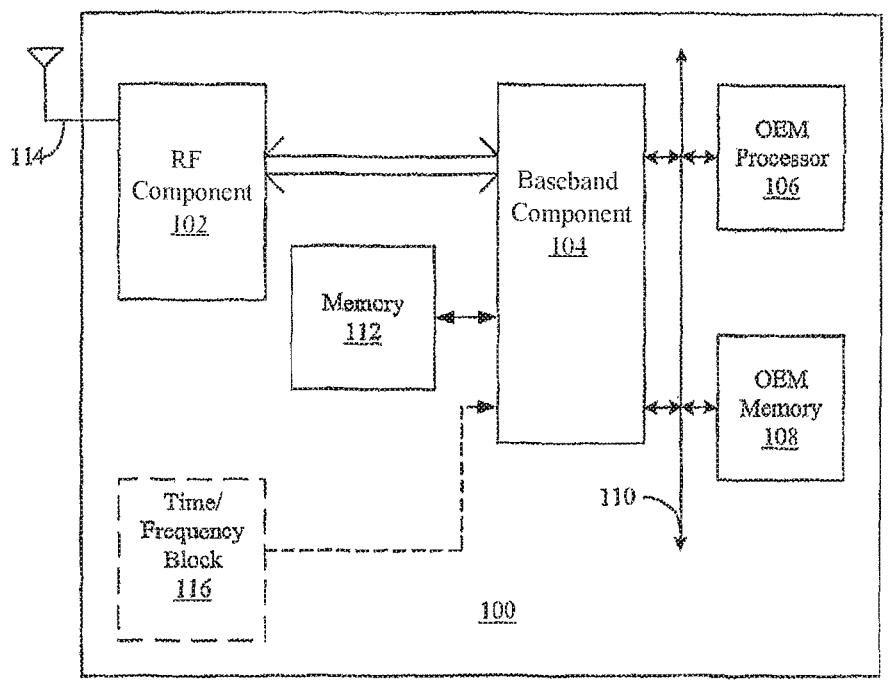
FIG. 1 illustrates a block diagram of an embodiment of a GPS receiver.

Turning to FIG. 1, a block diagram of an embodiment of a GPS receiver 100, including a radio frequency ("RF") component 102 and a baseband component 104. In one embodiment, the RF component 102 and the baseband component 104 may interface with additional functionality provided by an original equipment manufacturer ("OEM") subsystem, or "host" processor 106 and OEM memory 108 over a bus 110. As will be described below, the baseband component 104 may communicate with a memory component 112. The memory component 112 may be separate from the baseband component 104. In other implementations the memory component 112 may be implemented within the baseband component 104. The RF component 102 may be directly coupled to an antenna 114 that is dedicated to the RF component 102. In other implementations, the antenna 114 may be shared by the RF component 102 and an OEM receiver (not shown). Optionally, the OEM memory 108 may be separate from the memory component 112 and independent from the baseband component 104. Other possible arrangements may include one or more RF components and one or more baseband components being on one or more chips with all of the required memory and processing power to perform the GPS functions. In yet other implementations, multiple chips may be used to implement the GPS receiver 100 and may be combined with technology such as flip-chip packaging.

The GPS receiver 100 may also have a time/frequency component 116. The time/frequency component 116 may provide timing for tracking loops and real time clocks that function during power control conditions. The time/frequency component may be implemented as a real time clock and/or numerical controlled oscillators. The time/frequency component 116 may be in direct or indirect communication with the baseband component 104.

The GPS receiver 100 may operate without aiding information, or alternatively, it may operate with aiding information from a variety of sources and have additional hardware circuitry and software to communicate with a communication network or communicate with another network via the OEM processor 106. The communication may be implemented using standards, such as adopted by the Institute of Electrical Engineers, International Standards Organization, or Cellular communication standards, or by using a proprietary communication approach. Furthermore, the baseband component 104 may include such circuitry as a digital signal processor ("DSP"), an ARM processor, clock components, various memory components, various interface components for external and internal communication, etc.

In FIG. 2, a block diagram shows subsystems of an embodiment of the baseband component 104, including an input sample subsystem 202, a signal processor subsystem 204, a FFT subsystem 206, a memory subsystem 208, a sequencer subsystem 210, and another "miscellaneous" subsystem 212. For convenience herein the subsystems may be referred to as groups of processes or task implemented along with associated hardware. The division of tasks or functionality between the subsystems typically is determined by design choice.

In different implementations, the different subsystems may share functionalities in different ways, or there may be more a less subsystems. For example, in some implementations the sequencer subsystem 210 may not be a separate subsystem. Rather a part of the sequencer functionality may reside in one subsystem while the remaining functionality resides in another subsystem.

The input sample subsystem 202 receives signal data from the RF component 102, FIG. 1, and stores the signal data in RAM that is part of the memory subsystem 208, FIG. 2, raw digitized signal data or minimally processed decimated signal data may be stored in RAM. The ability to store the digitized RF signals may occur in one of two ways. The first is that data may be gathered by the input sample subsystem 202 in increments of 20 milliseconds and stored in RAM with the process being repeated over and over. The other approach is for the input sample subsystem 202 to use a cyclic buffer in RAM. For example the input sample subsystem 202 would fill a region of the RAM and then overwrite the data upon cycling through the buffers. Such an operational approach would have the software set up the signal processing subsystem 204 and the FFT subsystem 206 in such a way to process the signal data fast enough before the signal data is overwritten in the cyclic buffer. The operational approach may be selectable with the software configuring the approach that best meets the needs of the user and RF environment upon the GPS system 100 being initialized. In other embodiments, the operational approach used by the input sample subsystem 202 may be changed during operation of the GPS receiver 100.

The memory subsystem 208 manages the memory resources of the GPS receiver 100. A single memory area may be subdivided into different types of memory areas. Examples of the subdivided memory areas may include input sample memory, coherent buffers, cross-correlate memory, non-coherent buffers, channels state, track history, and report memory. The input sample memory may also be subdivided further into channels with the signal processing subsystem 204 and FFT subsystem 206 accessing different channels with context switching between the channels.

The miscellaneous subsystems 212 may include hardware and software for implementing a convolutional decoder for WAAS aiding data. The miscellaneous subsystems 212 uses data from the memory subsystem 208 and may provide information to other subsystems by writing into the channel state RAM area or other control/status areas in the memory subsystem 208.

Turning to FIG. 3, a diagram of signal flow between the subsystems of the GPS receiver 100 of FIG. 1 is shown. A RF signal, such as a CDMA GPS satellite signal, is received by the RF component 102, FIG. 1, and passed to the input sample processing subsystem 202, FIG. 3. The input sample processing subsystem 202 may include an input sample processing block 302 and a Timer/Automatic Gain Control (AGC) block 303. The Timer/AGC block 303 is made up of a number of counters, timers, and alarm generators that are used to sample input pulses of the input signal. The Timer/AGC block 303 may also create interrupts, start software and hardware functions at known times as well as conducting synchronization, and frequency and phase measurement. The Timer/AGC block 303 may provide the ability to synchronize two systems or subsystems by generating precision time alignment pulses or by accepting input pulses from other systems in addition to making relative frequency and phase measurements. For example in systems having a low power real-time (RTC) clock with a low cost watch type crystal, the watch type crystal may be calibrated to GPS time by the Timer/AGC block 303 in order to use the low cost low power RTC during power control conditions.

The input signal may be divided into digital samples in the input sample processing subsystem 202 with the output being stored in random access (RAM) memory 304. The RAM may be any type of read/write memory that may be written to and read from at a rate to keep data flowing between the input sample subsystem 202 and the signal processing subsystem 204. The signal processing subsystem 204 may have a signal processor 306 that interpolates and rotates the received signals from RAM 304.

The signal processor 306 may be used to remove the carrier Doppler and code Doppler from the received signals before the received signals are further processed and filtered. The signal processor 306 may be reconfigurable to operate in a variety of different sampling and decimation modes. In the highest performance mode, for example, the signal processor 306 may use sixteen samples per chip input and produces eight phase eight samples per chip output. In another mode the signal processor 306 may have four samples per chip input that may be interpolated to sixteen samples per chip by repeat sampling and filtering to produce better code phase output while reducing loss that typically occurs at low sampling rates. The modes of the signal processor 306 may be software controlled via parameters that are passed into the signal processor through the channel RAM.

Thus, the signal processor 306 extracts the input samples from the RAM 304 and prepares them for use by the matched filter 308. Depending on the mode of the matched filter 308 the input samples will be interpolated and/or decimated to the correct sampling rate for the matched filter 308. For example if the input samples are stored at 8/0 and the matched filter mode warrants using samples at 2/0, the signal processor 306 will decimate the input sample stream to 2/0. This provides additional flexibility in using various matched filter modes for various channel/satellite vehicle processing. The signal processor 306 may also rotate the complex input samples to remove the residual carrier Doppler from the signals and may be accomplished using the carrier NCO and code NCO outputs in conjunction with the input sample stream.

The signal processor subsystem 204 may also include a matched filter 308, coder 310, carrier and code numeric coded oscillator (NCO) 312, cross-correlator block 314, cross-correlation removal block 316, and a coherent summation block 318. The signal is processed and specific satellite signals identified. The carrier and code NCO 312 generate the pure carrier and code signals for use by the signal processor 306. The carrier and code NCO 312 may be programmable oscillators that may use counters to implement. The use of independent carrier and code NCOs for various channel/satellite vehicle processing provides flexibility for supporting the different types of processing modes in the GPS receiver.

The carrier and code NCO 312 enables a carrier to code transfer that does not require multiplication steps. Typically carrier to code aiding is done with limited resolution multipliers. The carrier and code phase transfers may be accomplished with an accumulated remainder without any error between carrier and code phase. It enables very narrow code loop bandwidths without the slippage or drift between the carrier and code phase as found in implementations that use limited resolution multipliers. The code phase is locked to the carrier and small adjustments may be made to the code phase relative to the carrier. By keeping track of the adjustments, a full resolution carrier and code phase may be reconstructed from few bits and flip-flops than other known methods.

The matched filter 308 may be configurable for various precision levels and code phase fractions. The GPS code is 1023 chips long and the match filter 308 may process or despread a full millisecond of the GPS code when operating in a full mode. In another mode, four subdivisions may be feed into the FFT to improve the frequency range or bandwidth searched per correlation. Yet, other modes may double the number of chips by dividing the chips. Thus, a tradeoff may be made between a fractional division in order to double the precision of the data that is correlated. The mode of the match filter 308 may be controlled and configured by the software depending on the operation mode and the power control setting of the GPS receiver 100.

For example if the GPS receiver 100 has information that only a fraction of the code chips need to be searched or tracked, the matched filter 308 may be set in half mode or a smaller mode. Such configuration will enable the use of smaller amounts of memory and result in a lower throughput data rate for the matched filter 308 and its outputs. On the other hand if the entire code phase needs to be searched, the matched filter 308 may be configured in a full mode making full use of processing power. The use of programmable T1 epochs allow for various coherent integration times for various channel/satellite vehicles thereby providing different frequency resolution in the searches.

The signals after being processed by the signal processor subsystem 204 are passed via RAM (coherent buffer 320 and cross-correlator 314) to the FFT subsystem 206. The cross-correlator 314 may be used to identify despread signals from a weak satellite. The software may save the output of signal processing subsystem 204 and makes it available to the FFT subsystem 206 for further cross correlation processing.

The cross-correlator 314 holds the output of the matched filter 308 in complex form (I,Q) for use by a cross-correlator removal process. In the cross-correlator removal process, some weak signal data from the past is required and strong signal processing is typically completed before the weak signals processing commences. This cross-correlator 314 provides the flexibility in allowing for more lag in the strong signal processing than other known approaches.

The coherent buffer 320 may be a first in first out (fifo) buffer that passes blocks of data from the output of a coherent accumulator to the input of the FFT 322. Each block of data in the coherent buffer 320 represents the shortest integrating time in the system and is associated with a scale factor to keep it within eight-bits (may be an exponent representation) of the value stored in FIFO1. Normalization may occur between the data stored in the coherent buffer 320 in order to have common scaling between the data supplied to the FFT 322. When operating in a locked mode, the data from the matched filter 308 may be directly feed to the FFT 206.

The coherent buffer 320 holds the output of the matched filter 308 as a complex value (I, Q). The coherent buffer 308 may be shared between channels or may be dedicated under software control. This provides flexibility for optimum use of the memory resources. For example if the receiver has information that allows processing of only the NCS buffers or peak buffers, then the coherent buffer 320 may be shared between channels resulting in memory resource savings.

The FFT subsystem 206 may include a multiplexer 321 that multiplexes the output of the matched filter 308 and data from the coherent buffer 320 and may be coupled to the Fast Fourier Transfer (FFT) block 322. The FFT subsystem 206 may also include a second multiplexer 323, a filter block 324, and a sorter block 326. The output of the FFT subsystem 206 may be from the sorter 326 to a detector block 328, from the non-coherent summation of the signal magnitude 324 to the non-coherent RAM 332, and from the FFT 322 to the Track history in RAM 334.

The track history in RAM 334 is a channel dependent buffer that may be generated for each channel. It contains information about the hardware tracking loop and its inputs are a time history. This channel dependent buffer may be used by software to execute software tracking loop algorithms to compute CNO, loss of lock and measurements. This information may also be used to run software tracking loops if the system warrants. Thus, the Track history in RAM 334 provides flexibility and enables a tradeoff between hardware and software processing for different channels. The Track history buffer may be enabled or disabled for various channels independently.

The FFT subsystem 206 is configured to enable short coherent integrations and combine them and get the effect of doing many times the correlations at different offset frequencies and avoids having to rerun the signal processing subsystem, thus resulting in a power savings. The FFT 322 may also generate other types of data for use by the GPS receiver 100, such as, for example, bit-sync and generation of a frequency discriminator for use by the tracking loops.

The detector 328 interfaces with the non-coherent RAM 332 and writes the data extracted to RAM 330. The non-coherent RAM 332 is a buffer that contains a three dimension histogram of code offset, millisecond offset and frequency offset that may be resolved by choosing the largest peak in the non-coherent RAM 332. Bias removal and scaling also may occur within the data in the non-coherent RAM 332.

A list of the largest eight peaks may be stored in memory to aid in selection of the largest peak. In other implementations, different amounts of the peaks may be stored. The list may be implemented as a linked list or other searchable data structure.

In one implementation, the architecture obtains data bit synchronization for signals with a carrier to noise (C/N0) ratio at or lower than 21 dB Hz. Two different approaches are described below for resolving approximately 1 ms of ambiguity within a 20 ms data bit in the signal transmitted by a given satellite. In other words, the approaches accurately determine, within a 20 ms window, the time at which a data bit transition has occurred to accurately locate a bit transition in the transmitted signal. The approaches include a time domain histogram approach and a frequency domain histogram approach.

In the time domain histogram approach, the architecture creates a time domain histogram from time domain samples of the signal transmitted by a given satellite. In summary, the architecture sums samples taken at a pre-selected rate (e.g., 1 ms samples) over a moving window with a pre-selected length (e.g., 20 ms). Subsequently, twenty different hypotheses are postulated, one for each 1 ms shift of the moving window. A histogram with twenty bins (each corresponding to a different hypothesis) is then built by accumulating the sum of the linear envelope, $(\sqrt{I^2+Q^2}$, over successive data bits. The accumulation results in bins in the histogram of differing magnitudes. The bin with the largest magnitude corresponds to the hypothesis that is closest to the true data bit transition.

In one implementation, the architecture may then obtain a refinement of the estimate by performing, a multipoint interpolation on the bins. For example, the architecture may perform a three-point interpolation using the largest bin and two adjacent bins, one on each side of the largest bin.

In the frequency domain histogram approach, the architecture takes a moving window of pre-selected length (e.g., 20 ms). The window may include twenty (20) 1 ms samples. The architecture applies a sample to each of twenty (20) inputs of a multi-point Fast Fourier Transform (FFT) circuit. As one example, the FFT subsystem may determine a 32 point FFT. Subsequently, a pre-selected number (e.g., twenty) different hypotheses are postulated, for example one hypothesis for each 1 ms shift of the moving window and twenty corresponding FFT operations each corresponding to a unique hypothesis.

The architecture may then build a two dimensional histogram. One axis or dimension of the histogram may correspond to the 32 FFT output bins, and the other axis may then correspond to the twenty hypotheses. The histogram may be built by accumulating the linear envelope, $(\sqrt{I^2+Q^2})$, over successive data bits. The accumulation results in bins in the histogram of differing magnitudes. A bin may be a counter or a more complex structure, implemented in either hardware or software. The bin with the largest magnitude corresponds to the hypothesis that is closest to the true data bit transition and for the frequency that is closest to the input carrier frequency. Hence, a search across the frequency dimension gives the architecture the closest frequency. At that frequency, the architecture then searches the hypothesis axis for the best bit synchronization (bit transition) hypothesis.

Simulation results are presented below to highlight the performance of the two approaches noted above. The simulations assume equally likely random data bits of +1/−1. The simulation runs over approximately 25,000 trials, with a statistical analysis set forth below. For each trial, a stopping condition was in place, and was chosen such that the accumulations occur for longer periods when the signal is weaker, and when the number of transitions is less.

A time based stopping condition may be determined by accumulating the envelope of the difference between the present data bit and the previous data bit, $(\sqrt{(I_1^2-I_2^2)+(Q_1^2-Q_2^2)})$, summing over all the hypotheses. Note that the difference is noise only, if there is no actual bit transition and proportional to twice the signal amplitude if there is a transition. The accumulations terminate when the accumulated difference reaches a preset threshold. At weak signal strengths, the signal amplitude is smaller and takes longer to reach the threshold and hence the simulation runs longer.

A frequency based stopping condition may be determined by accumulating the envelope as noted above, but having the accumulation performed on the output of the frequency domain histogram, That is, the architecture accumulates the envelope of the difference between the present data bit and the previous data bit (over all frequency bins) and sums over all the hypotheses.

For the results demonstrated below, the time based stopping condition may be employed for both time and frequency histogram approaches. In the simulations, the true bit transition is randomly generated anywhere in the range of 0-20 ms. If the error between the estimate and the true transition is greater or equal to 0.5 ms, an error is declared. The error statistics are obtained from a pre-selected number (e.g., 25,000) of trials. The number of transitions (and time to obtain bit synchronization) is also determined. In addition, a time out condition with a pre-selected duration (e.g., 8 seconds), checked with a time out counter, is employed to prevent the loops iterating indefinitely.

Table 1, below, provides a comparison of the time domain and frequency domain histogram approaches assuming a known carrier frequency. The probability of wrong detection of the bit transition may be used to compare and choose between the two algorithms for any particular implementation.

TABLE 1

| C/N0 (dBHz) | Avg. number of transitions | Probability of wrong detection | |
|---|---|---|---|
| | | Time Histogram | Frequency Histogram |
| 45 | 2.75 | 0.00308 | 0.00316 |
| | 3.26 | 0.00052 | 0.00028 |
| | 3.73 | 0.00004 | 0.00008 |
| 30 | 10.95 | 0.00188 | 0.00188 |
| | 21.04 | 0.00004 | 0.00004 |
| 22 | 70.7 | 0.00136 | 0.00136 |
| 21 | 75.3 | 0.00376 | 0.00464 |
| 20 | 79 | 0.01040 | 0.01020 |

Table 2 shows the detection errors for frequency errors within a bin for the two algorithms

TABLE 2

| C/N0 (dBHz) | Frequency error (Hz) | Probability of wrong detection | |
|---|---|---|---|
| | | Time Histogram | Frequency Histogram |
| 22 | 0.0 | 0.00 | 0.00 |
| | 8.0 | 0.00012 | 0.00004 |
| | 15.0 | 0.00824 | 0.00796 |
| | 24.0 | 0.829 | 0.00 |
| | 32.0 | 1.00 | 0.00 |

As can be seen from Table 1, when the carrier frequency is known, the performance of the two algorithms is similar. Also from Table 2, the performance of the two algorithms is similar for frequency errors within a bin. Note that the bin 0 may be centered at 0 Hz and bin 1 may be centered at 31.25 Hz. The differences at 24 Hz and 32 Hz are due to the fact that in the frequency domain histogram, these frequencies fall in the vicinity of the adjacent bin.

One advantage of the frequency domain approach is that it the architecture may employ if as a joint frequency synchronization and bit synchronization. That is, the frequency domain algorithm, while providing the benefits of the time domain approach, also operates over multiple frequency trials in parallel. A performance curve of the frequency domain histogram approach for a small frequency offset (2 Hz), where the criteria for stopping is the time domain based threshold count. The same threshold value was used for all C/N0 and for all frequency offsets plotted in FIG. 2.

The performance curve is the time to acquire bit synchronization across C/N0 for the case where there is a small frequency error. At 22 dB, only 1 error was observed out of 25,000 trials, Thus the performance of the frequency domain histogram approach is similar to the time domain approach, across C/N0s for small frequency offsets when using the same stopping criterion.

The time to acquire bit synchronization across C/N0 for the case where the stopping criterion is based on the output of the frequency domain histogram may be shown as a curve of the time to acquire bit synchronization across C/N0 for the case where there is a small frequency error of 2 Hz. The curve of bit synchronization has the advantage of simultaneously performing frequency estimation and bit synchronization. Note that the time domain approach employs a certain amount of information regarding the frequency error to accurately to provide reliable bit synchronization (in a serial fashion). In the joint approach, however, the architecture may obtain an estimate of the carrier frequency along with the bit boundary in a parallel fashion.

The architecture further includes interpolation and smoothing circuitry and methods to that improve resolution of carrier frequency and code phase estimates for ranging signals transmitted by the SPS satellites that arrive in weak condition. In one implementation, the architecture employs discrete values of carrier Doppler and code phase, and the interpolation and smoothing techniques improve on the discrete values. For example, the interpolation and smoothing techniques may process the quantized frequency and time bins prepared as noted above with regard to bit synchronization and acquisition in order to improve a carrier frequency determination and a time determination.

The architecture may perform carrier frequency interpolation in different ways. For example, assuming seven 1 ms coherent samples are input to an eight point FFT (with one zero for the remaining input) and 3426 (6*571) times non-coherent integration results in a total time of 24 seconds and the FFT computes eight bin magnitudes each of resolution 125 Hz, Without interpolation, the bin with the maximum magnitude would ordinarily be chosen, yielding a possible error in the range of −62.5 to 62.5 Hz in the absence of binning errors. Binning errors, which happen at low C/N0s, may result in larger errors.

In the analysis that leads to choosing a frequency interpolation technique, the frequency error is swept across one bin and the estimate for each frequency error is obtained as the bin with the maximum magnitude. The architecture then adjusts the frequency estimate by using an interpolation to improve the estimate, for example, a multi-point (e.g., 3-point) parabolic interpolation. This interpolation may employ the maximum magnitude bin and the magnitude of the adjacent bin on each side of the maximum.

The peak position of a sampled quadratic can be located using the sampled peak and the two adjacent peaks. For a sampled quadratic function y, with sampled peak $y_m$ and the δ from m, the three samples about the peak are related by $$y_{m-1} = \alpha(m-1-\delta)^2 + b$$

$$y_m = \alpha(m-\delta)^2 + b$$

$$y_{m+1} = \alpha(m+1-\delta)^2 + b$$

Setting m=0 and solving for δ yields $$\delta = \frac{(y_{m+1} - y_{m-1})}{(2y_m - y_{m+1} - y_{m-1})}$$

and m−δ provides an accurate peak of the sampled quadratic.

Evaluating code phase interpolation may be performed, in one instance, assuming zero frequency error and a total range of +/−1 chip. Thus, for 0.5 chip correlator spacing, there are five (5) code phase bins, each spaced 0.5 chips apart, i.e. (−1, 0.5, 0, 0.5, 1). For the other correlator spacings, a similar analysis may be performed.

I and Q samples for each of the five assumed time hypothesis may be generated by the following equations:

$$I = \sqrt{2CT/N_0}\rho(\tau - \tau_0) + x$$

$$Q = Y$$

In the evaluation simulations, the code phase error, $\tau_0$, may be swept across one bin, for example, −0.25 chips to 0.25 chips and the estimate for each error may be obtained by identifying the bin with the maximum magnitude.

The architecture may then improve the code phase error using the three (3) point parabolic interpolation explained above, using the maximum magnitude code phase bin (out of the five bins as explained above) and the magnitude of the adjacent bin on each side of the maximum. Consideration may also be taken to account for the correlation between noise samples for bins, which are spaced less than a chip apart.

Figure 10:
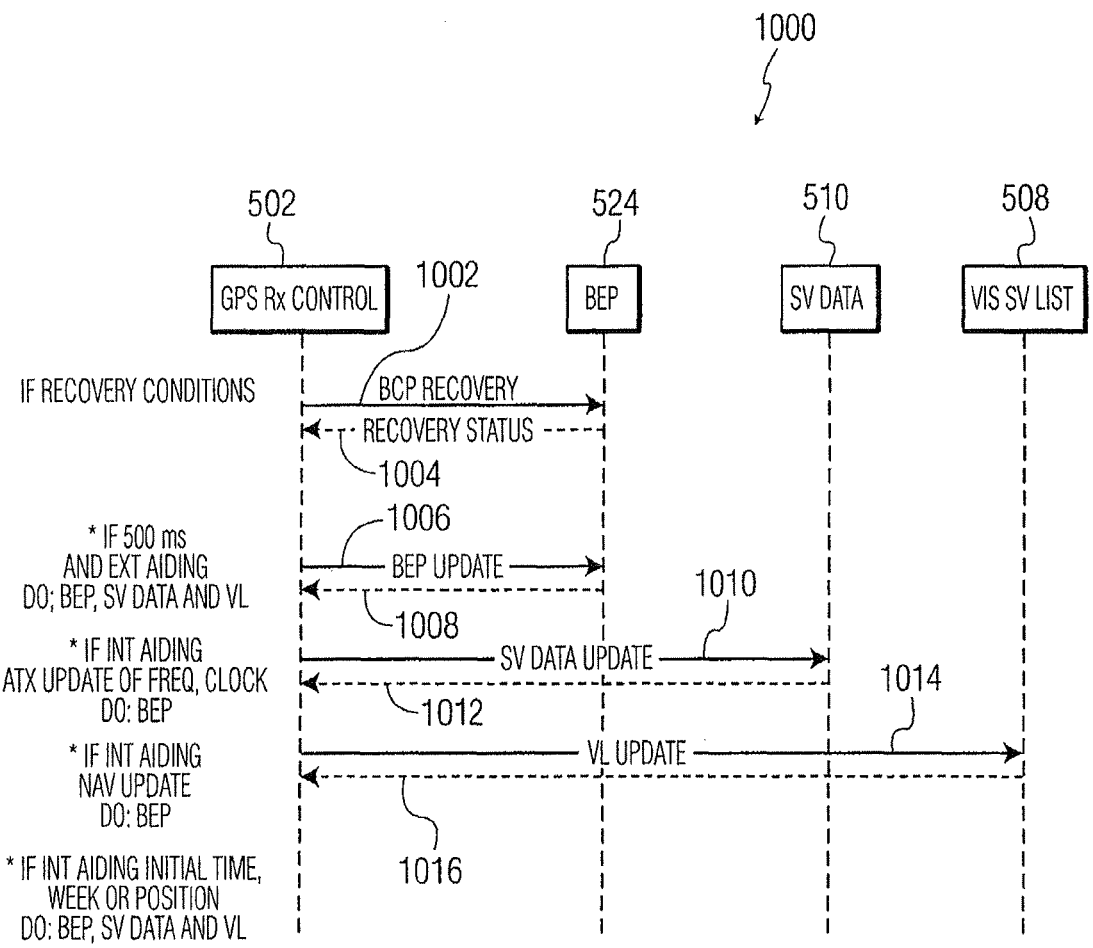
FIG. 10 is a sequence diagram of a recovery condition between the modules of FIG. 5.
Figure 11:
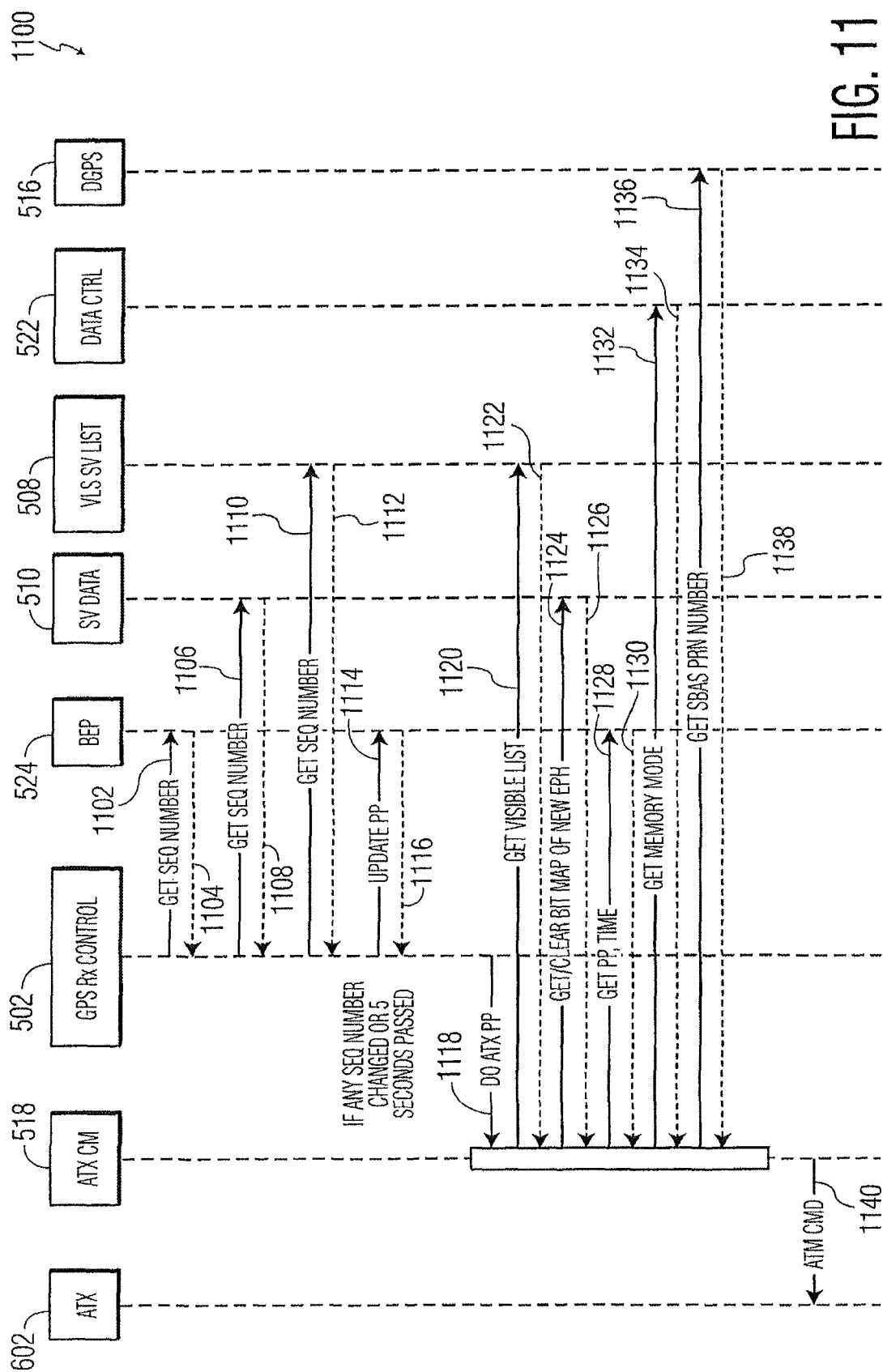
FIG. 11 is a sequence diagram of acquisition and tracking pre-positioning configuration of the ATX control module of FIG. 5.

An alternate method of interpolation yields the results shown in FIGS. 10 and 11. In the alternate method, the architectures selects four bins from the five bins of the code phase search space, then performs a four point FFT employing the four bins. The FFT outputs are then zero padded to twice the size and an inverse FFT using the eight point FFT is then carried out. The peak is then estimated from the eight point inverse FFT output. In one implementation, the architecture chooses the four out of the five bins so that the maximum bin and a higher adjacent bin occupy the center of this four bin selection that may be implemented as an array in hardware or software.

The above techniques can be generalized to any correlator spacing desired. For instance, for a correlator spacing of 1/N chips, there would be a total of 2N+1 bins to cover the range [4:1] chips. From these 2N+1 bins, the architecture may select 2N bins as described above. The architecture may then perform a 2N FFT on these 2N bins (Step 1208), followed by a padding of 2N zeros to the FFT output, and then an 4N size inverse FFT.

Table 3, below, shows the effects of binning errors for the cases considered above (again assuming 1000 trials). Table 3 provides slightly pessimistic bounds for the case of frequency/code phase that lie at the edge of the bin, because in reality these scenarios will result in useful energy in the adjacent bins.

TABLE 3

| | Pfa for NCS = 571 | | Pfa for NCS = 6*571 | |
|---|---|---|---|---|
| | delta_f = 0 | delta_f = fbin_size/2 | delta_f = 0 | delta_f = fbin_size/2 |
| Carrier doppler interpolation (8 pt. FFT) | 17 dB: 0.000<br>15 dB: 0.003<br>12 dB: 0.162 | 17 dB: 0.002<br>15 dB: 0.051<br>12 dB: 0.296 | 17 dB: 0.000<br>15 dB: 0.000<br>12 dB: 0.001 | 17 dB: 0.000<br>15 dB: 0.000<br>12 dB: 0.016 |
| | delta_tau = 0 | delta_tau = −0.20 chip | delta_tau = 0 | delta_tau = −0.20 chip |
| Code phase interpolation (0.5 chip spacing) | 17 dB: 0.000<br>15 dB: 0.006<br>12 dB: 0.165 | 17 dB: 0.184<br>15 dB: 0.296<br>12 dB: 0.504 | 17 dB: 0.000<br>15 dB: 0.000<br>12 dB: 0.000 | 17 dB: 0.012<br>15 dB: 0.071<br>12 dB: 0.226 |

The effect of the limited bandwidth on the correlation function may be estimated for the code phase parabolic interpolation. For example, assume a chip spacing of ⅛ chip, no binning errors, and parabolic interpolation, with the correlation triangle filtered by a 6 MHz bandwidth filter and an unsynchronized decimator for the ⅛ chip spacing. Near the peak of the correlation triangle, the variance from the filtered correlation triangle is higher due to the flattening in the triangle.

In one implementation, employing Doppler frequency interpolation, the parabolic interpolation with padding of nine zeros may provide an improvement at weak signal levels. For the code phase interpolation, the zero padded FFT algorithm provides lower errors in the center of the bin compared to the parabolic interpolation and in larger variation in mean values.

The architecture also performs peak assignment, for example, to choose the correct set of peaks (one for each satellite) from a given set of multiple peaks for the satellites. The technique for peak assignment may operate on input data including aiding information with respect to an assumed reference position (e.g., the reference position at the center of the uncertainty region). The aiding information, as examples, may include a list of visible satellites (pseudo random noise (PRN) IDs), code phase indices (modulo 1023) for each satellite (e.g., at 1 chip resolution), Doppler values, line of sight (los) vectors to the satellites, a maximum horizontal position error (in meters) and a maximum velocity error (in m/s).

Equation 1 shows the measured data $$\begin{aligned}PRN_1 &= \{p_{11}, p_{12}, \ldots, p_{1N}\}\\ PRN_2 &= \{p_{21}, p_{22}, \ldots, p_{2N}\}\\ &\vdots\\ PRN_M &= \{p_{M1}, p_{M2}, \ldots, p_{MN}\}\end{aligned} \quad \text{Equation 1}$$

where there are M satellites and a set of N peaks for each satellite. Each peak is characterized by a corresponding code offset modulo 1023 (i.e., $0 \leq p_{ij} \leq 1022$), carrier frequency, and amplitude. In other words, each element in the above {M,N} matrix is characterized by a code offset, frequency, and amplitude parameter. Thus, element $p_{ij}$ will be characterized by 3 parameters $\{c_{p_{ij}}, d_{p_{ij}}, \alpha_{p_{ij}}\}$ where $c_{p_{ij}}$ is the code phase index of $p_{ij}$, $d_{p_{ij}}$ is the Doppler of $p_{ij}$, and $\alpha_{p_{ij}}$ is the amplitude of $p_{ij}$.

In performing peak assignment, the architecture may assume that the peaks are arranged in the order of decreasing amplitudes for a given satellite, that the satellites are arranged in descending order of their strengths (e.g., based on the first element for each satellite (i.e., each row)), and that aiding information is available for the PRN ids in the measured data (Equation 1).

The first two assumptions together imply that the first row will correspond to the strongest satellite and within the first row; the peaks are arranged in the descending amplitudes. Arranging the data in this manner may improve search speed, in the case where the architecture does not perform an exhaustive search of all possible combinations, while increasing the probability of finding the correct set of peaks.

The peak indices and peak Doppler values may be obtained through the acquisition process (possibly aided). Hence, it is likely that the measured peak indices and Doppler values in Equation 1 lie within a window, bounded by position uncertainty, velocity uncertainty, time uncertainty, and frequency uncertainty.

The architecture, in one implementation, will determine a set of correct peaks according to criteria discussed below. The determined set of peaks (given by $[p_{11}\ p_{21}\ \ldots\ p_{M1}]$) may be an array with M elements with each element corresponding to a unique satellite. The array of M elements may be implemented in hardware or software as a data structure such as an array, link list, or other structure that maintains the relationship of the array elements.

In determining the set of correct peaks, the architecture may proceed according to the determination technique. The technique generally includes the steps of: Pruning, Upper Bounds, and Applying a Decision Technique. Pruning preprocess the measured data to reduce the size of the data set (the number of peaks). In the Upper Bounds step, the architecture employs the uncertainty information (position and time) and the LOS vectors to obtain bounds on the uncertainty between the measured index (Doppler) values and the reference index (Doppler) values. During application of the decision technique; the architecture applies a decision technique that employs the uncertainty bounds and the measured data to arrive at a determined set of peaks.

In the discussion below, reference to single differences are references to differences between satellite i with satellite j while double differences are the differences on single differences between a user's receiver and reference data (e.g., the aiding information).

In the pruning step, the architecture reduces the size of the measured data, while employing little or minimal processing. In one implementation, the architecture performs pruning by employing the amplitude information (recall that peaks are arranged in order of decreasing amplitudes).

For example, the architecture may discard all peaks that satisfy:

$$a_{p_{ij}} < k_1 * a_{p_n}$$

where i in the above equation is the satellite number and j=2, 3, . . . 8 denotes the position in the set.
$k_1$, $(0 < k_1 < 1)$
is a threshold constant and thus, if
$k_1 = 0.5$
the architecture discards peaks which are less than half the size of the strongest peak. For the satellites with the strong signals, where a dominant peak stands out, a set with one element per strong satellite may result.

In the step of applying upper bounds, the architecture employs apriori uncertainty information on the position and velocity to obtain upper bounds on the expected code phase index (Doppler) difference between the values provided at the reference and those measured at the true position.

The range measured by the user from the true position at time t to satellite i is given by:

$$r_i(t) = \hat{r}_i(t) - \hat{l}_i(t) * \Delta x + c * b_{ii}(t) + v_i \qquad \text{Equation 2}$$

where c is the speed of light (m/s), $b_{ii}$ is the bias in the receiver's clock (s), The term $v_i(t)$ represents the measurement noise (m). The terms with ^ denote the estimate values (at the reference). The line of sight vectors are given by $$\hat{l}_i(t) = \frac{s_i(t) - x}{|s_i(t) - x|}$$

Note that in the equation 2 above, $r_i(t)$ denotes the range measurement at the true user position u. The first term on the right side $\hat{r}_i(t)$ represents the range measurement at the center of the uncertainty (reference position). The second term denotes the error due to the uncertainty in true receiver position and the third term denotes the bias in the receiver time.

Calculating the single differences from two different satellites, i and j:

$$r_i(t) - r_j(t) = (\hat{r}_i(t) - \hat{r}_j(t)) - (\hat{l}_i(t) - \hat{l}_j(t)) * \Delta x + (v_i - v_j) \qquad \text{Equation 3}$$

In the Equation 3, the left hand side denotes the single difference in ranges between satellites i and j as referenced to the true user position u. The first difference term on the right hand side denotes the range differences between satellites i and satellite j at the center of the uncertainty. The second term represents the error due to the user position uncertainty, Note that this is also a function of the geometry of the satellites.

Rewriting equation 3 to express the double differences and omitting the measurement noise term gives:

$$[r_i(t) - r_j(t)] - [(\hat{r}_1(t) - \hat{r}_j(t))] = (\hat{l}_i(t) - \hat{l}_j(t)) * \Delta x \qquad \text{Equation 4}$$

Similarly for Doppler:

$$[d_i(t) - d_j(t)] - [(\hat{d}_1(t) - \hat{d}_j(t))] = (\hat{l}_i(t) - \hat{l}_j(t)) * \Delta u \qquad \text{Equation 5}$$

where $d_i$ and $\hat{d}_i$ are the measured Doppler at the true user location and the reference location respectively due to satellite i, and $\Delta u$ denotes the uncertainty in user velocity.

Equations 4 and 5 provide the architecture with upper bounds on the double differences (between satellite i and satellite j) in code phase indices (Doppler) between those at the reference position and those measured at the true position.

Next, the architecture applies a decision technique to determine a selected peak for each satellite from the set of peaks obtained at noted above. In one implementation, the architecture employs a cost vector in arriving at a determined set of peaks. Thus, for example, the architecture may select a set of peaks from the matrix in Equation 1 by forming a column vector (one column), where each element in the column vector corresponds to a unique satellite.

For instance, choosing the first elements for each satellite yields the vector:

$$[p_{11}\ p_{21}\ \ldots\ p_{M1}]$$

For the chosen column vector, the next stop is to form the single differences in their code phase indices and Doppler. For the amplitudes, the architecture may form the corresponding pair wise product of the amplitudes:

$$[(c_{p11} - c_{p21})(c_{p11} - c_{p31}) \ldots (c_{p11} - c_{M1})(c_{p21} - c_{31}) \ldots \\ (c_{p21} - c_{pM1}) \ldots (c_{p(M-1)1} - c_{pM1})]$$

$$[(d_{p11} - d_{p21})(d_{p11} - d_{p31}) \ldots (d_{p11} - d_{M1})(d_{p21} - d_{31}) \ldots \\ (d_{p21} - d_{pM1}) \ldots (d_{p(M-1)1} - d_{pM1})]$$

$$[(a_{p11} * a_{p21})(a_{p11} * a_{p31}) \ldots (a_{p11} * a_{M1})(a_{p21} * a_{31}) \ldots \\ (a_{p21} * a_{pM1}) \ldots (a_{p(M-1)1} * a_{pM1})]$$

The architecture may employ the absolute values of these terms. For the code phase indices, the architecture may employ:

$|c_{P_{11}} - c_{P_{21}}|$ if $|c_{P_{11}} - c_{P_{21}}| < 512$ $1022 - |c_{P_{11}} - c_{P_{21}}|$ otherwise Note that the size M of the single difference vectors above is M=2. Thus for M=5, there are a total of 10 elements in each of the vectors above. The architecture repeats the above step for the estimates at the reference position. Thus for the given code phase indices (Doppler) at the reference position (a vector of size M), the architecture forms the single differences. In addition, the architecture also forms the magnitude of the single differences for the line of sight vectors. All the resulting vectors are of size M=2 in the current implementation.

The architecture then, by employing the results of the bounding steps, obtains the upper bound in the error differences (double differences) between the values at the true position and the reference position (right hand sides of equations 4 and 5).

For the code phase indices, the bound will be: position uncertainty (in chips)*LOS vectors (magnitude of single differences).

For Doppler values, the bound will be: (velocity+position) uncertainty (in Hz)*LOS vectors (magnitude of single differences).

The architecture also obtains the (double difference) error term for code phase indices and Doppler. The error term is the difference in the single difference values at the true position (explained above) and those at the reference position (explained above). Note that the error term vector is also of size M=2.

Next, the architecture compares the error terms against the bounds on an element-by-element basis. If an element of the error term is greater than the corresponding bound element, the architecture increases the cost vector proportional to the inverse of the peak amplitude pair wise products formed as noted above and proportional to the difference in the error terms (double differences) and the upper bound. Note that this weight will be assigned to both elements (i.e. peaks) that were used in forming the single difference. Then, if the error term is less than the corresponding bound, the cost vector is not changed. The architecture may follow this procedure for all M choose 2 elements. At the end of this step, the architecture obtains a cost vector of size M.

The architecture may then repeat the same procedure for the Doppler terms without resetting the cost vector. When the cost vector is equal to zero (all M elements identically zero), the architecture may determine that this corresponds to the optimum peak vector, and stop the search. Otherwise, the architecture saves the cost vector, resets it and returns to choose a new set of peaks as noted above with regard to forming the column vector.

When all combinations of peaks have been searched without having a zero cost vector, then the architecture may select the set of peaks with the lowest cost vector magnitude. In the case of a tie, the architecture may select the set of peaks that occurs, for example, first in the search process.

The discussion below details the tracking system for the architecture for strong and medium signal operation. The following abbreviations may be used below: Alpha, Beta: Generic filter coefficients that may take different values at different instances; FFT: Fast Fourier Transform; SPS: Satellite Positioning System; HWTL: Hardware Tracking Loop; NCO: Numerically Controlled Oscillator; PDI: Pre Detection Integration; RAM: Random Access Memory; S_Gain: Filtered Signal amplitude estimate employed to normalize the tracking loops; SWTL: Software Tracking Loop; T1: Basic Time epoch for Subsystem 2; Threshold, Threshold1, Threshold2: Generic Threshold values that may take different values at different times.

The hardware and software tracking loops and acquisition plan 335 resides in the memory subsystem 208 in addition to the track history, bit sync, I/Q phase, and the 100 ms report data in RAM 304, 314, 320, 332, 334 respectively. The hardware tracking loops implement simple tracking loop equations in hardware and are controlled by software setting various parameters in the channel records. In some cases of extreme signal conditions (very weak signals or widely varying dynamic conditions) it may be preferable to run more complex signal tracking algorithms as opposed to simple tracking loops. In such cases the hardware tracking loop will be aided by the software tracking loop to obtain enhanced performance. The capability to have both hardware and software tracking loops provides this flexibility.

The coherent data may be used by software for determining parameter changes in the hardware and software tracking loops. An advantage over the prior art is the ability to access both the coherent data and the phase history data with respect to time. The use of this data enables the GPS receiver 100 to adjust the processing of the data signals and the data may also acts as an indication of the quality of operation of the GPS receiver 100.

The tracking loops may be split into two components. The first being a hardware tracking loop and the other being a software tracking loop. The hardware tracking loop operates at a high rate of speed. The hardware tracking loop is partially controlled by the NCO and counters. The software tracking loop operates at a lower speed and may use more complicated algorithms than the hardware tracking loop. The hardware tracking loop and software tracking loop makes use of parameters contained in the memory subsystem 208. The use of two types of tracking loops enables a level of redundancies and monitoring of the operation of the hardware while increasing the efficiency of the hardware tracking loop based upon the algorithms used by the software tracking loop.

A previously discussed, an area of memory may be divided into channels that are groupings of input signal data. The channels may then be processed by the signal processing subsystem 204 followed by the FFT subsystem 206 sequentially. The signal data is passed between subsystems via the memory subsystem 208, The state of the different channels is contained in the channel state RAM 338.

The memory subsystem 208 may further have memory that is rewritable such as RAM or permanent such as ROM for storing machine-readable encoded instructions. The term RAM and ROM are used to describe the operation of a type of memory that may be implemented using specific types of memory such as SDRAM, DDR, PROM, EPROM, or EEPROM memory to give but a few examples. The machine-readable instructions are typical encoded as modules that when executed control numerous functions of the GPS receiver 100 of FIG. 1, Examples of such modules are control loops, expert systems, power control, tracking loops, and types of acquisition. Similarly, other modules may control the different internal and external interfaces and messaging between subsystems and between the GPS receiver and OEM equipment.

The sequencer subsystem 210 has a sequencer controller 336 that control a sequencer that oversees the operation of the signal processing subsystem 204 and another sequencer that oversees the operation of the FFT subsystem 206. Rules are implemented that keep the two sequencers synchronized. The rules are commonly called lapping rules and prevent one sequencer from advancing to another channel before the current sequencer has processed that channel's data. In other implementations, a single sequencer may be implemented to control the separate subsystems.

Figure 4:
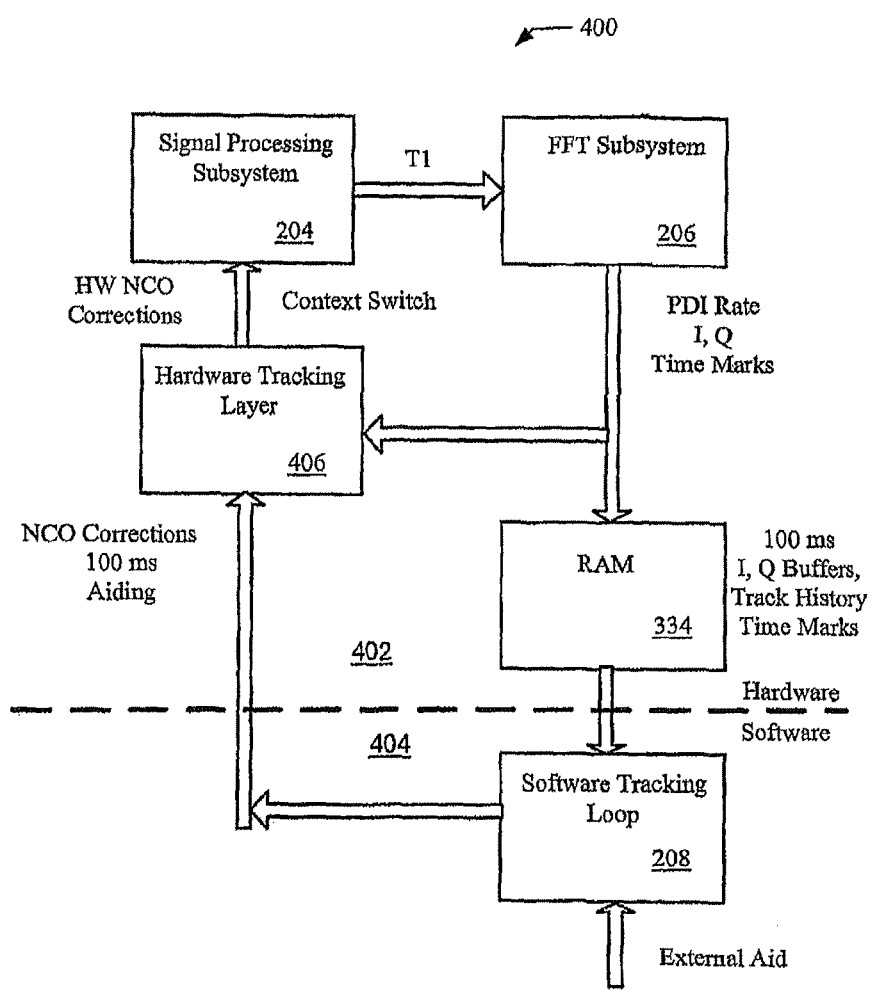
FIG. 4 is a diagram of the division between software and hardware within the GPS receiver of FIG. 1.

Turning to FIG. 4, a diagram 400 of the division between hardware and software processing of the data signal within the GPS receiver 100 of FIG. 1 is shown. The diagram 400 is divided between a hardware side 402 and a software side 404. On the hardware side 402, there may be the signal processing subsystem 204, FFT subsystem 206, the non-coherent summation and track history buffer (RAM) 334, and a hardware tracking loop 406. On the software side there may be a software tracking loop 408. In other implementations, there may be more or fewer blocks shown in a diagram such as FIG. 4, The purpose of FIG. 4 is to provide a conceptual overview of how once the hardware is setup there is limited interaction directly from software. There may be numerous other software processes and tasks that are not shown in FIG. 4 such as, for example, the expert system and power control to name but a few.

The GPS data signal be processed by the signal processing subsystem 204 and passed to the FFT subsystem 206 at a T1 interval. The output of the FFT subsystem 206 may be I and Q data, and time marks at a rate that PDIs (an amount of data from the coherent buffers that is needed by the FFT in order to operate) are available. The data may be stored in the NCS/TH Buffer 334 and sent to the hardware tracking layer 406 that implements the hardware tracking loop. The hardware tracking layer 406 may then feed back hardware NCO corrections that can be used by the carrier and code NCO 312, FIG. 3.

The hardware side 402, FIG. 4 communicates with the software side 404 via memory such as, for example, when the NCS/TH buffer 334 is accessed by the software tracking loop 408. The software tracking loop 408 may operate at a lower speed than the hardware tracking loop and spend more time processing the data contained in memory in order to derive NCO corrections and 100 ms aiding information. Such information is placed into a memory that is accessed by the hardware tracking layer 406 an in turn picked up by the signal processing subsystem 204 at an appropriate time, such as during a context change (switching channels within the memory).

Turning to FIG. 5, a module interaction diagram 500 of the GPS receiver 100 of FIG. 1 is shown. The control module of the GPS receiver 100 is the referred to as the GPS receiver control module 502. The GPS receiver control module 502 communicates with numerous other modules including a reset module 504, QoS module 506, visible satellite vehicle (SV) list 508, SV data 510, aiding module 512, navigation (NAV) module 514, DGPS module 516, acquisition tracking cross-coordinator (ATX) control manager module 518, power management module 520, data control module 522, Best Estimate Possible (BEP) module 524, UI GPS module 526, module interface (MI) module 528, and background/periodic task modules 530.

The GPS receiver control module 502 may be implemented as a processing loop that continually cycles to process communication with the other modules. In another implementation, an interrupt approach may be used to communicate with the other modules and/or hardware components. Furthermore, a combination of a processing loop and interrupts may be employed to communicate with the other modules and hardware that make up the different subsystems.

The reset module 504 is responsible for making sure the UPS receiver 100 is reset an initialized properly. The reset module 504 initializes all the subsystems including the memory subsystem 208 upon a reset event occurring or upon initial power-up. The reset module 504 may obey a command from the GPS receiver control module 502. A command being issued by the GPS receiver control module 502 to the reset module 504 causes the reset module 504 to clear selected memory locations and buffers an initialize them with known values, A reset command may be received at the GPS receiver control module 502 from the user interface via the UI GPS module 526 or upon power being initially applied to the GPS receiver 100. The reset module 504 may initiate a partial reset or a full reset of the GPS receiver 100. Upon a partial reset, the SV data module 510, DGPS module 516, and the BEP module 524 may continue to operate and receive data updates from external sources.

The QoS module 506 may be responsible for determining the quality of service available at the GPS receiver 100. The QoS module 506 may be provided with information from other modules, such as information from the visible SV list 508. If a location determination would be unavailable under the current environment, the QoS module 506 may direct that additional information be employed, such as information provided by the aiding module 512. The visible SV list module 508 may maintain a list of the SVs that may be tracked by the GPS receiver 100. The ATX control manager module 518 may track the signals from these SVs and works with the other subsystems.

The GPS receiver control module 502 may update the SV data module 510 that stores the almanac data received via the GPS receiver control module 502 from a satellite vehicle. The almanac data may contain information about satellite vehicles that make up a constellation of satellite vehicles. The satellite vehicle data module 510 may also contain additional data that is associated with satellite vehicles or acquisition of satellite vehicles. In other embodiments, the visible SV list module 508 and satellite vehicle data module 510 may be combined into a single data structure within a single module.

The aiding module 512 may have location data that is received from another device, such as a location server or other wireless/GPS device that may communicate over another network. Examples of aiding data may include, but are not limited to, predetermined position, clock frequency, SV location information, and almanac data. The GPS receiver control module 502 may access the aiding module 512 to retrieve or store aiding information. The aiding module 512 may be continually updated by the GPS receiver 100 and processed into navigation data. In other implementation, the OEM portion of the GPS receiver 100 may provide the communication connection and data for the aiding module 512.

The NAV module 514 formats the navigation data for use by other modules and the system. The NAV module 514 uses measurement data from other modules and determines a NAV State that includes, but is not limited to, User Position, User Clock Bias, User Velocity, User Clock Drift, User position Uncertainty, User Clock Uncertainty, User Velocity Uncertainty, User Clock Drift Uncertainty. An example of such a measurement data format in pseudocode is:

```
NAV Measurement Structure
{
    UINT32 Timetag;              //Acquisition Clock lsw
    UINT32 Timetag2;             //Acquisition Clock msw
    double measTOW;              //User time
    UBYTE SVID;                  //Sat ID for each channel
    double Pseuodorange;         //Pseudorange in meters
    float CarrierFreq;           //Pseudorange rate in meters/seconds
    double CarrierPhase;         //Integrated carrier phase in meters
    short TimeIn Track;          //Count, in milliseconds how long SV is in track
    UBYTE SyncFlags;             //This byte contains two bit-fields which report the
            integration interval and sync achieved for the channel
            Bit 0: Coherent Integ. Interval (0=2ms, 1=10ms)
            Bit 1,2: Sync
    UBYTE CtoN[10]               //Average signal power in db-Hz for each 100mz
    UINT16 DeltaRangeInterval;   //Interval for the preceding second. A value of zero
                                 indicates that an AFC measurement or no
                                 measurement in the CarrierFreq field for this
                                 channel
    INT16 MeanDeltaRangeTime;    // Mean time of the delta-pseudo range interval in
                                 milliseconds measured from the end of the interval
                                 backwards
    INT16 Extrapolation Time;    // The pseudo range extrapolation time in
                                 milliseconds, to reach a common time tag value
    UBYTE PhaseErrorCount;       // The count of phase errors greater than 60 degrees
                                 measured in the preceding second (as defined for
                                 each channel)
    UBYTE LowPowerCount;         // This is the count of power measurements less than
                                 28 dB-HZ in the preceding second (as defined for
                                 each channel)
        #ifdefFALSE_LOC
        double TruRange;         //* true range *//
        long GPSSecond           //* Integer GPS seconds *//
        long ClookOffset;        // *clock offset in Hz *//
        #endif
        char MeasurementConsistency; // Flag to indicate measurements are consistent//
        double ValidityTime;     // Receiver Time to Validity//
        short PRQuality;         // Pseudo Code Quality//
        float PRnoise;           // 1 sigma expected PR noise in meters//
        float PRRnoise;          // 1 sigma expected PRR noise in meters/sec
        short PRRQuality;        // Quality measurement of the PRR//
        float CarrierPhaseNoise; // 1 sigma expected Carrier Phase noise in meters//
        short PowerLockCount     // Count of Power Lock Loss in 1 second 0-50//
        short CarrierLockCount   // Count Phase Lock Loss in 1 second 0-50//
        short msAmbiguity        // Millisecond ambiguity on measurement//
} tNavMeas.
```

Additional formatting may be included for DGPS and WAAS position location data. The NAV module 514 receives data from the FFT subsystem 206 and determines the position of the GPS receiver 100.

The UPS receiver control module 502 also may communicate with the DGPS module 516. The DGPS application module 516 functions with a hardware receiver to receive a DGPS signal. The DGPS signal contains GPS correction data that enables the GPS receiver 100 to more precisely determine its location. The DGPS module 516 may also assist in better location determination when selective availability is active. The DGPS corrections used in the DGPS module 516 may also have a specific format such as RTCM or RTCA formats.

The ATX control manager module 518 interfaces with the hardware that processes received signals from selected satellite vehicles. Most modules do not interface with hardware directly, rather the modules may access common memory that hardware accesses. The ATX control manager module 518 is an exception and may use a sub-module to directly interface with the hardware of the signal processing subsystem 204 and FFT subsystem 206. In other implementations, numerous modules may interface directly with the hardware.

The GPS receiver control module 502 communicates with a power manager module 520. The power manager module 520 may receive information from the power supply hardware, such as battery power levels via memory. The power manager module 520 may also have the ability to turn on and off different subsystems in order to conserve energy based upon the quality of received GPS signals, UI GPS module, state of processing, or power levels. The power manager module 520 may also have the ability to put the UPS receiver 100 asleep, including the RB block 102. A real time clock provides timing signals that enable the GPS receiver to be awoken rapidly and configured to continue processing location data.

The power manager module 520 may also track power information, such as power level of batteries and enables the information to be accessed by the GPS receiver control module 502. The Information may be accessed by the power manager module 520 sending messages to the GPS receiver control module 502. In other implementations, the GPS receiver control 502 may query the power manager module 520. The GPS receiver control module 502 may then change the operating mode of the GPS receiver 100 or take other actions based on the amount of power available.

An interface may allow power control of subsystems, such as the RF subsystem and clocks. The various subsystems involved in the baseband processing may be idled under software control. For example if there is no data to process for more than five channels then the software that implements the power manager module 520 will set only five channels in the channel records. The hardware will then execute only those five channels in sequence thus reducing memory accesses. The sequencer can be shut down under software control and will stop baseband processing completely. The RTC has an independent power source that enables the RTC counters to be active and the RTC clocks to be active for power up operation. The power control approach allows for flexibility in implementing power control in power manager module 520. Thus the power utilization can be optimized based on information available in the GPS receiver 100 to minimize power needed per position fix.

The data control module 522 controls the access to the non-volatile data that is stored in the non-volatile memory (NVM) across resets or power downs. The data control module 522 may also provide verification of the memory and integrity of the stored data (i.e. checksums) upon powering/waking up the GPS receiver 100.

The BEP module 524 is a database formed by data structures of information being currently used by the GPS receiver 100. Information received at the GPS receiver 100 that affect the timing control of the different subsystems is maintained in the BEP module 524.

The GPS receiver 100 may also have a user interface that receives input from external sources, such as buttons, touch screens, mice, or keyboards. The user interface communicates via the UI GPS module 526 that initially receives the external inputs from a user. The inputs are processed and the GPS receiver control module 502 takes appropriate action. The GPS receiver control module 502 may receive user input data by event flags that are set by the UI GPS module 526 and may send information by setting another event flag. In other implementations, the GPS receiver control module 502 may receive messages from the UI GPS module 526 with user interface data.

The MI module 528 encapsulates the GPS functionality of the other modules and isolates the GPS functionality from the outside world and resources. The outside world may be OEM equipment that is collocated within the GPS receiver 100 or may be devices that are interfaced to the GPS receiver 100.

In additional to other modules, numerous background modules 530 or task may be executing at any time. Examples of such background modules include trash collection (reclaiming used resources), watchdog timers, interrupts handlers, hardware monitoring to name but a few.

Figure 6:
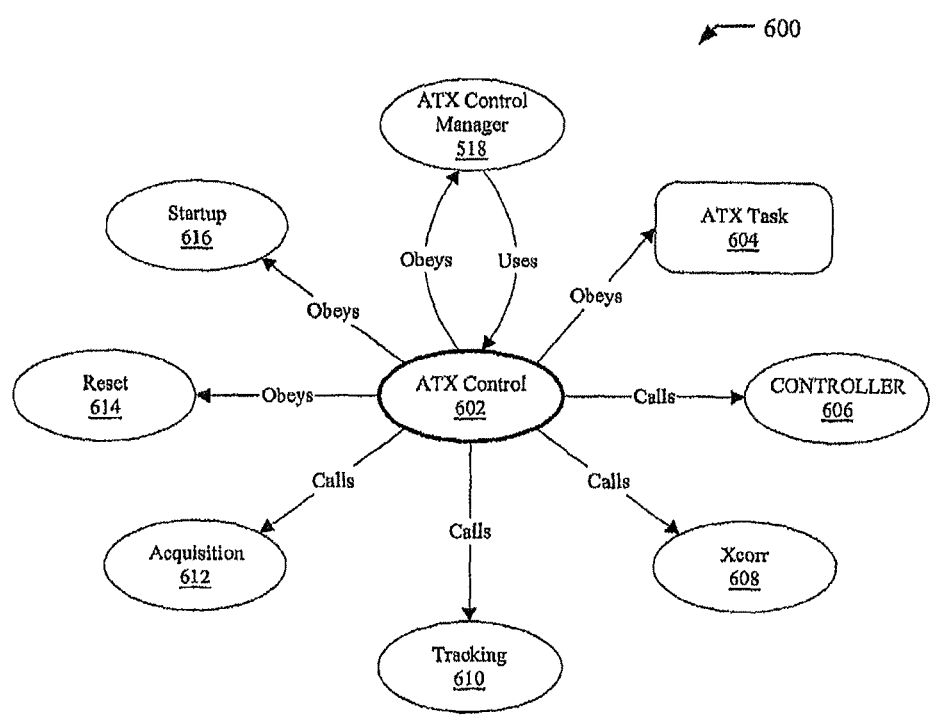
FIG. 6 illustrates the task within the ATX control module of FIG. 5.

Next, in FIG. 6, an illustration 600 of the ATX control sub-module 602 within the ATX control manager module 518 of FIG. 5 is shown. The ATX control manager module 518 communicates with the ATX control sub-module 602. The ATX control sub-module 602 additionally communicates with the ATX task 604, a controller 606 such as a digital signal processor, microprocessor, digital logic circuit executing a state machine to give but a few examples, cross-correlator task 608, tracking task 610, acquisition task 612, reset task 614, and startup task 616. The tasks may be sub-modules within the ATX control manager module 518 that may interface with hardware such as the controller 606 or cross-correlator 608. Or, tasks may be implemented in software that executes upon certain conditions occurring, such as the reset task 610 and startup task 616.

Upon startup of the GPS receiver 100, the ATX control manager module 518 activates or runs the startup task 616 via the ATX control sub-module 602. The startup task 616 initializes the other tasks to known states. The ATX task 604 than proceeds to interface with the controller 606, cross-correlator task 608, tracking task 610, and acquisition task 612 and the hardware in signal processing subsystem 204 and prepares to process received positioning signals. In other implementations, there may be fewer or more tasks within the ATX control manger module 518 and tasks may be combines or subdivided into more or fewer tasks.

Figure 7:
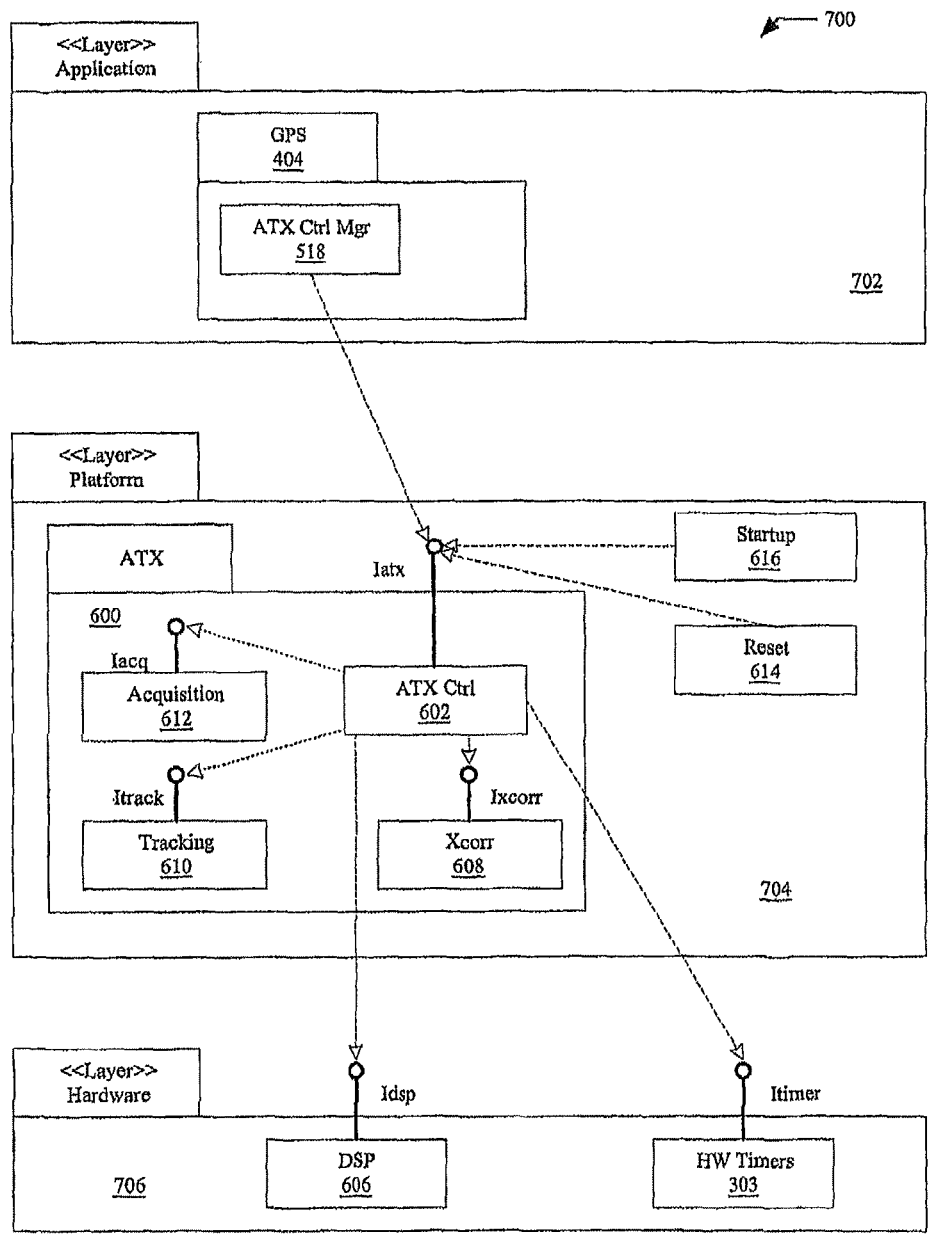
FIG. 7 illustrates the implementation layers within the GPS receiver of FIG. 1.

In FIG. 7, an illustration 700 of the implementation layers of the GPS receiver 100 of FIG. 1 is shown. The application layer 702 is typically software 404 that is grouped into modules or task that are associated with the operation of the GPS receiver 100. An example of a software module is the ATX control manager module 518. The ATX control module communicates to the ATX control sub-module 602 that resides in a platform layer 704, The platform layer 704 is a layer between the application layer 702 and the hardware layer 706.

The platform layer 704 is where the majority of the ATX functions reside. The ATX control sub-module 602 is able to receive messages from the ATX control manager may be 518 residing in the application layer 702, reset task 614 and startup task 616 that reside in the platform layer 704. The ATX control sub-module 602 also communicates with the cross-correlator task 608, tracking task 610 and the acquisition task 612. The ATX control sub-module 602 may also communicate the hardware, such as the controller 606 and HW timers 303 that reside in the hardware layer 706.

Figure 8:
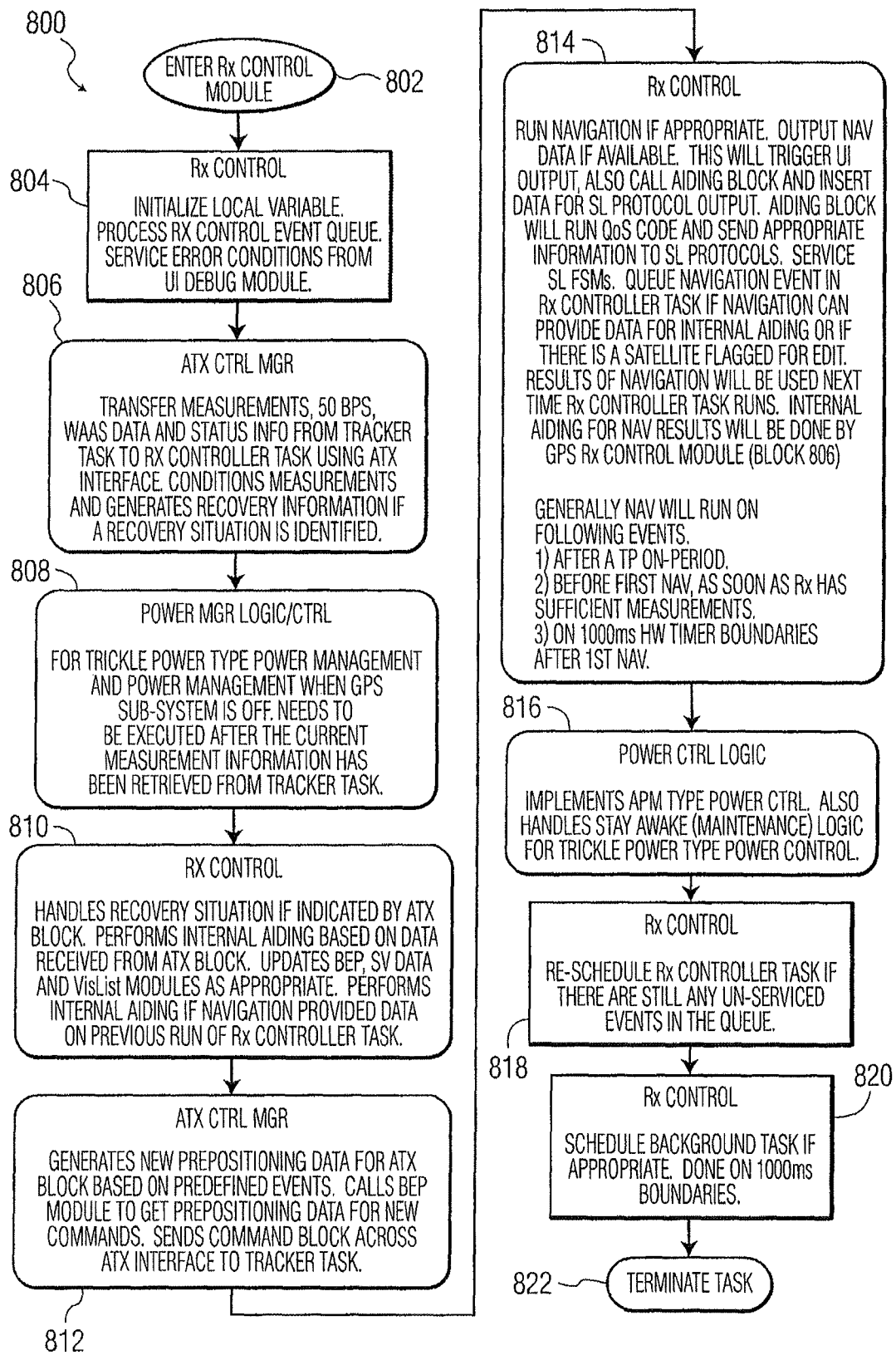
FIG. 8 is a flow diagram for the GPS receiver control module of FIG. 5.

Turning to FIG. 8, a flow diagram 800 the GPS receiver control module 502 of FIG. 5 is shown. The flow diagram 800 starts when a receiver controller task is started 802 in the GPS receiver control module 502. The receiver controller task initializes local variable and processing receiver control event queue in addition to servicing error conditions from the UI GPS module 526 and the background task 530 in block 804.

The ATX control manager module 518 transfers measurements, WAAS augmentation data and status information from tracker hardware to the GPS receiver control module 502 using the interface provided by the ATX control manager module 518 in step 806. Based upon the measurement conditions, the ATX control manager module 518 determines if recovery information may be generated and if a recovery situation is identified.

The GPS receiver control module 502 then accesses the power management module 520 in step 808. For trickle power type power management and power management when the GPS portion of a GPS receiver 100 is off. The power management module 520 is accessed after the current measurement information has been retrieved from the ATX control manager module 518.

If a recovery situation is indicated by the ATX control manger modules 518, then the GPS receiver control module 502 performs internal aiding based on data received from the ATX control manager module 518 in step 810. The BEP modules 524, SV data module 510, and the visible satellite in the visible SV list module 508 are accessed and updated as needed for the recovery.

New prepositioning data is generated by the GPS receiver control module 502 for use by the ATX control manager module 518 based on predefined events in step 812. The ATX control module 518 may access the forced updating module 524 in order to get prepositioning data.

The GPS receiver control module 502 may cause the NAV module 514 to execute and output navigation data if available in step 814. This may trigger the UI GPS module 526, aiding module 512 and result in formatting of the navigation data. The aiding module 512 may cause the QoS module 506 to execute and make the appropriate data available to other modules and subsystems. The results generated by the NAV module 514 may be used the next time the receiver controller task executes. Generally, the NAV module 514 will execute on the following events: After a trickle power on-period, before the first NAV module 514 execution (as soon as the receiver has sufficient measurements) and on 1000 ms hardware timer boundaries after the first NAV module 514 execution. The GPS receiver control module 502 may then cause the power manager module 520 to be placed in an advanced power management type power control and has a background module or task 530 that may handle the "stay awake" maintenance for trickle power control in step 816.

The GPS receiver controller module 502 services any events that may be in the event queue and schedule the running of the navigation process that resides in the NAV module 514 to execute at predetermined periods (such as every 1000 ms) 820. Processing is shown as completing 822, but in practice processing may continuously execute or execute upon initialization and/or during a reset condition.

Figure 9:
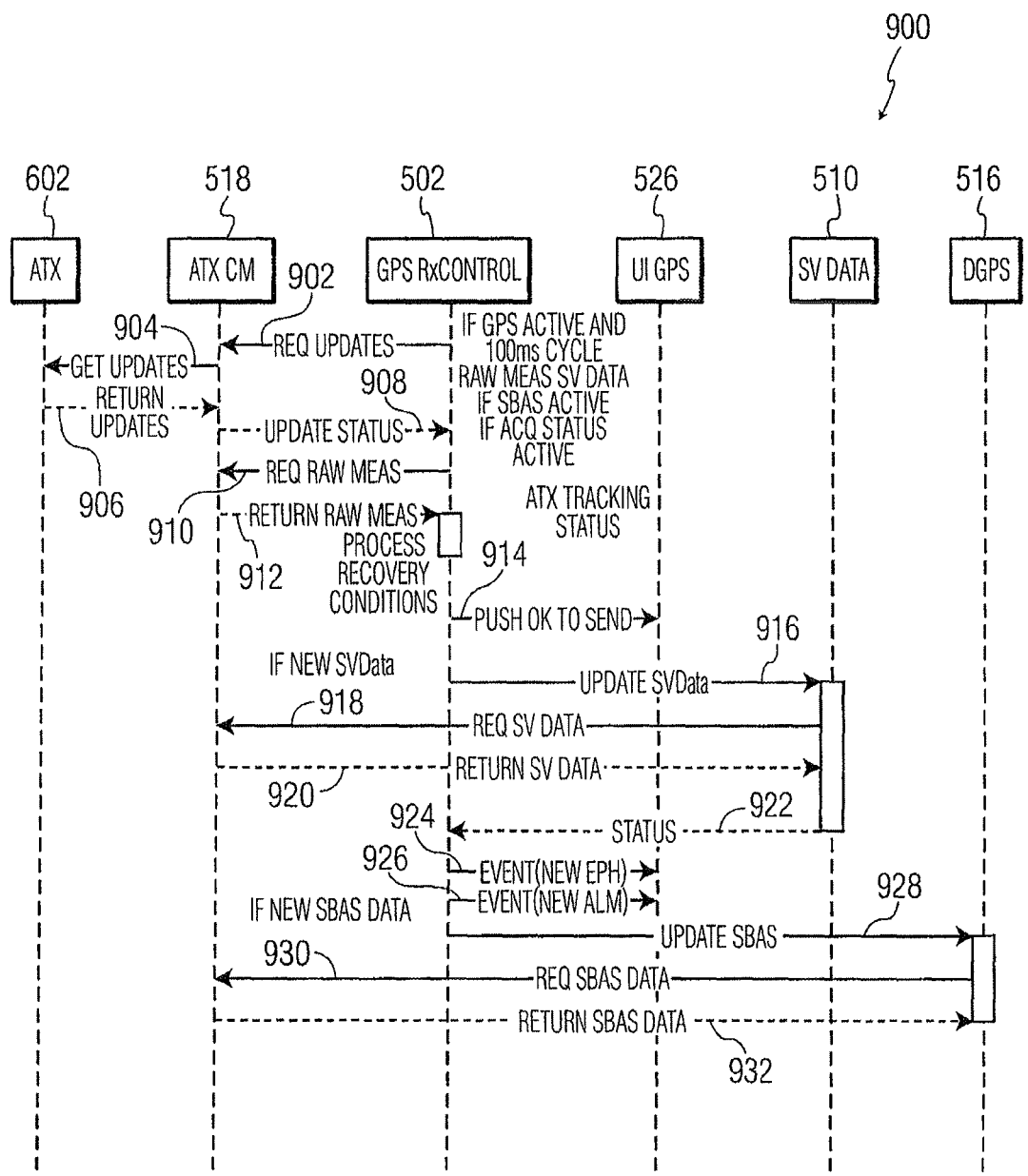
FIG. 9 is a sequence diagram of the communication between the different modules of FIG. 5 in order to acquire location measurements.

In FIG. 9, a sequence diagram 900 of the communication between the different modules of FIG. 4 to in order to acquire location measurements is shown. The GPS receiver control module 502 requests an update of raw location measurements 902 from the ATX control module 518. The ATX control manager module 518 then accesses the ATX control sub-module 602 that access the hardware to get the raw location measurements. The ATX control sub-module 602 returns the updates 906 and the ATX control manager module 518 sends an update status 908 to the GPS receiver control module 502, The GPS receiver may be configured to seek updates every 100 ms. The GPS receiver control module 502 then may request the raw location measurements by sending a "Req Raw Meas" message to the ATX control manager module 518. The ATX control manager module 518 then returns the raw location measurements in a "Return Raw Meas" message 910. The GPS receiver control module 502 then processes the recovery conditions 912 based upon the ATX tracking status indicated in the "Return Raw Meas". The GPS receiver control module 502 then indicates with a "Push OK TO Send" 914 message to the UI GPS module 526 that the raw location measurements are available.

If new satellite vehicle data is available as indicated by the ATX control manager module 518, then the UPS receiver control module 502 sends the "Update SVData" message 916 to the satellite vehicle data module 510. The satellite vehicle data module 510 then request the SV data from the ATX control manager module 518 by sending the "Req SVData" message 918, The ATX control manager module 518 returns the SV data by sending the "Return SVData" message 920 to the SV data module 510. The SV data module 510 then sends an updated status message 922 to the GPS receiver control module 502. The status message 922 from the SV data module 510 results in the GPS receiver control module 502 generating an event that is processed by the user interface GPS module 528 identifying that new ephemeris data 924 and new almanac data 926 may be available.

If new satellite based augmentation system (SBAS) data is available, then the GPS receiver control module 502 sends an "update SBAS" message 926 to the DGPS module 516. The DGPS module 516 then sends a "Req SBASdata" message 728 to the ATX control module 518. The ATX control manager module 518 processes the "Req SBASdata" message 730 and responds with a "Return SBASdata" message 732 to the DGPS module 516.

Turning to FIG. 10, a sequence diagram 1000 of a recovery condition between the modules of FIG. 5 is illustrated. A series of tests for aiding sources are done prior to recovery and conditions are set based on the aiding source. In the current implementation, after all tests are completed the respective modules are called. If a recovery condition exists, the GPS receiver control module 502 sends a "BEP Recovery" message 1002 to the BEP module 514. The BEP module 514 then response with a "recovery status" message 1004 that is sent to the GPS receiver control module 502. The GPS receiver control module 502 updates the BEP module 514 when a "BEP Update" message 1006 is sent to the BEP module 514. The force update module 514 then responds to the GPS receiver control module 502 by sending a "BEP update Response" message 1008. Similarly, the GPS receiver control module 502 sends a "VL Update" message 1014 to update the visible SV list module 508. The visible SV list module 508 is then updated and an acknowledgment 1016 is returned to the GPS receiver control module 502. Examples of some of data integrity conditions may include a recovery condition being initiated by the GPS receiver controller, external aiding is available, internal aiding is available, and frequency clock needs updating.

In FIG. 11, a sequence diagram 1100 of acquisition and tracking pre-positioning configuration of the ATX control module 518 of FIG. 5 is shown. The GPS receiver control module 502 sends "get sequence number" messages 1102, 1104, and 1106 to the BEP module 524, SV data module 510 and the visible list module 508. The BEP module 424, SV data module 510 and the visible SV list module 508 each responds to the GPS receiver control module 502 respectfully, with a "sequence response message" 1108, 1110 and 1112.

The GPS receiver control module 502 then determines if any of the sequence numbers received from the other modules have changed. If any of the sequence numbers have changed or five seconds have passed then an "update prepositioning" message 1114 is sent to the BEP module 524. The BEP module 524 response with an acknowledge message 916.

The GPS receiver control module 502 sends a "do ATX propositioning" message 1118 to the ATX control module 518. The ATX control module 518 sends a "get visible list" message 1120 to the visible SV list module 508 in response to the "do ATX prepositioning" message 1118. The visible SV list module 508 sends a response message 1122 to the ATX control module 518 containing a list of the visible satellites. The ATX control module 518 then gets or clears the bit map of new ephemeral data in the SV data module 510 by sending a "get/clear message" 1124 to the SV data module 510. The SV data module 510 then sends an "acknowledge" message 1126 back to the ATX control manager module 518.

The ATX control module 518 also accesses the BEE' module 524 with a "get preposition time" message 1128 and receives the preposition time in a "preposition time response" message 1130. The memory mode is determined by the ATX control manager module 518 sending the "get memory mode" message 1132 to the data control module 522 and receiving a "memory mode response" message 1134. The ATX control manager module 518 may also access the DGPS module 516 via a "get SBAS PRN number" message 1136 (that gets the satellite base augmentation system pseudo random number) and the DGPS data is received at the ATX control manager module 518 in a "SEAS PRN Response" message, 1138. The accessing of prepositioning data from other modules by the ATX control manager module 518 may occur simultaneous or in any order. Once the prepositioning data has been acquired by the ATX control manager module 518, then the ATX control manager module 518 accesses the ATX control sub-module 602 with the ATX command 1140.

Figure 12:
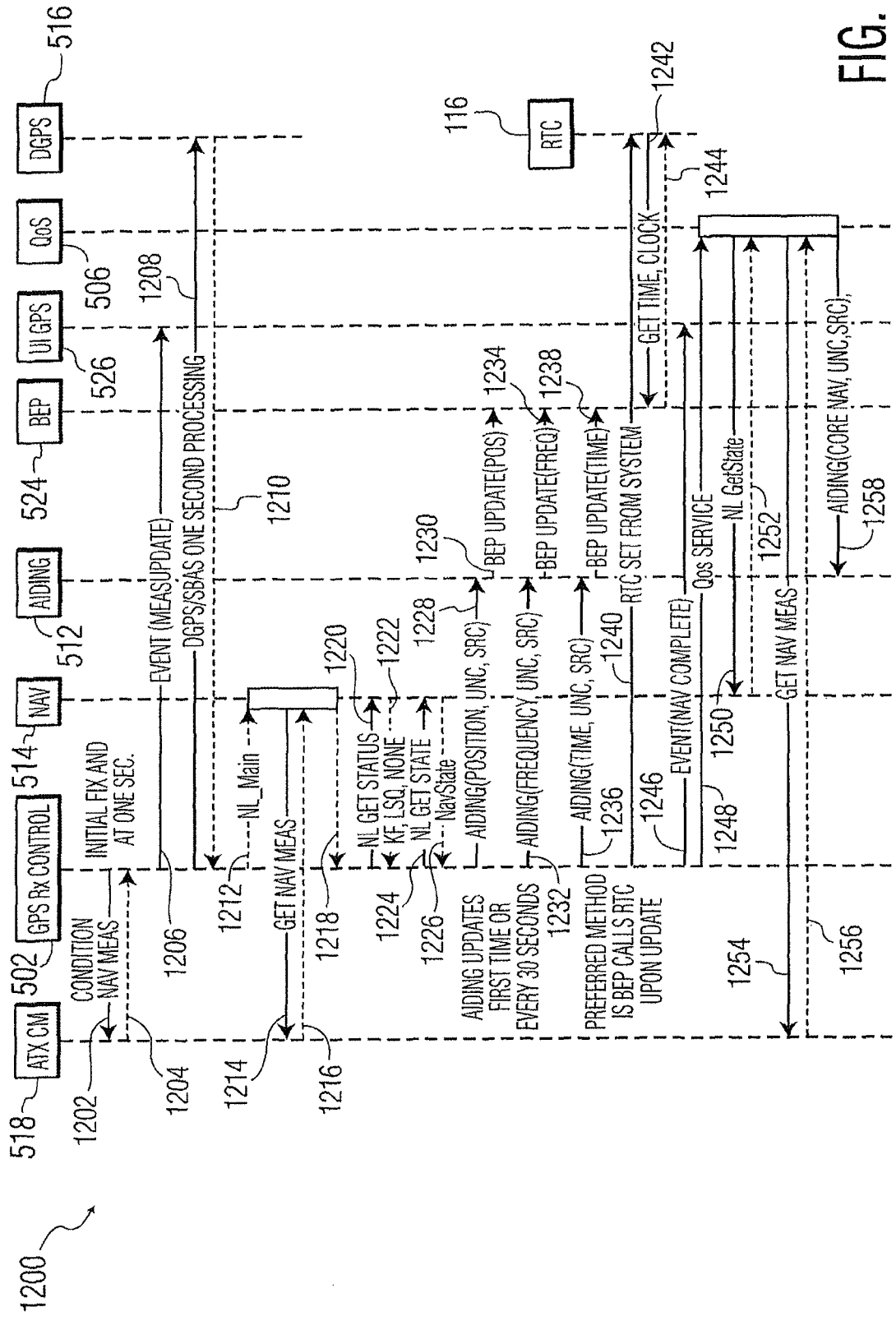
FIG. 12 is a sequence drawing of communication with the navigation module and quality of service module of FIG. 5.

Next in FIG. 12, a sequence drawing 1200 of the navigation module and quality of service module 506 of FIG. 5 is shown. The GPS receiver control module 502 sends a "condition NAV meas" message 1202 to the ATX control manager module 518 to get navigation measurements upon the initial location fix of the GPS receive 100 and at one-second intervals there after. In other implementations the navigation measurements may occur upon other events or upon other periods of time. The ATX control manager module 518 responds with the navigation measurements 1204, The UPS receiver control module 502 then triggers a MEASUPDATB event 1206 that is acted upon by the UI GPS module 526. The GPS receiver control module 502 also sends a "DOPS/SBAS One Second Processing" message 1208 to the DGPS module 516. The DGPS module 516 may respond with SBAS data 1210 to the UPS receiver control module 502. The GPS receiver control module then sends the NAV condition and SBAS data to the navigation module 514 in a "NL_Main" message 1212.

The NAV module 514 then acts on the received information and gets navigation data from the ATX control manger 518 by sending a "Get Navigation Measurement" message 1214, The ATX control manager 518 accesses the common memory and retrieves the navigation data. The ATX control manager 518 then responds 1216 to the NAV module 514. The NAV module 514 then sends a notification 1218 to the GPS receiver control module 502.

The GPS receiver control module 502 then sends a "NL get Status" message 1220 to the NAV module 514. The NAV module 514 responds with a message 1222 that contains the status of information for the NAV module 514. The GPS receiver control module 502 also sends a "Get Status" message 1224 to the NAV module 514, which responds, with the "NavState" message 1226.

The GPS receiver control module 502 may receive aiding information every thirty seconds (in other embodiments this may be asynchronous or at variable rates) if such data is available, by sending and "Aiding" messages 1228 to the aiding module 512 to update the position data with a "BEP update position" message 1230 to the BEP module 524, The GPS receiver control module 502 also sends a message 1232 to the aiding module 512 to update the frequency data in the BEP module 524. Similarly, an aiding message 1234 is sent to the aiding module 512 to update the time in the BEP 524 with the "BEP update time" message 1236.

The GPS receiver control module 502 may also send a "RTC Set from System" message 1238 to the real time clock (RTC) 116. The preferred method is for the BEP module 524 to call the RTC 116 upon updates occurring. The RTC 116 then request the time information by sending the "Get Time, Clock" message 1240 to the BEP module 524. The BEP module 524 responds with time adjustments 1242 to the RTC 116.

Upon the navigation processing being complete, the GPS receiver control module 502, triggers an "NAV COMPLETE" event 1244 to signal to the UI GPS 526 that navigation processing is complete. Furthermore, the GPS receiver control module 502 sends a "QoS Service" message to the QoS module 506 to update the service parameters for the GPS receiver 100. The QoS module 506 sends a "NL GetState" message 1246 to the navigation module 514. The NAV module 514 responds 1248 with state information to the QoS module 506. Upon getting the navigation state information, the QoS module 506 sends a "Get Nay Meas" message 1250 to the ATX control manager module 518. The ATX control manger module 518 responds back to the QoS module 506 with navigation measurements 1252 and then sends information 1254 that may be useful in aiding to the aiding module 512.

Turning to FIG. 13, a sequence drawing 1300 of the power management with the power manager module 420 of FIG. 4 is shown. The GPS receiver control module 502 sends a "PM_APM" message 1302 to the power manager module 520 to activate advance power management (APM). The APM power control and trickle power control maintenance may occur every second in the current implementation, but in other implementations the time period for maintenance may be a different period. The power manager module 520 sends a "Get Acq Status" message 1304 to the ATX control manager module 518. The ATX control manager module 518 responds back with the acquisition status 1306. The returned status may be APM power down now, TP power down now, or TP stay awake. The status is then relayed from the power manager module 520 to the GPS receiver control module 502 with a "Return Status" message 1308. The GPS receiver control module 502 the signals with a "PushOKtoFix(FALSE) event 1310 to the power manager module 520.

The GPS receiver control module 502 then may send a "LP Cycle Finished" message 1312 and a "LP OKToSleep" message 1314 to the power manager module 520 notifying the power manager module 520 that it is GPS receiver 100 is read for power control. The power manager module 520 then responds 1316 to the GPS receiver control module 502. The GPS receiver control module 502 then sends a "LP Set Processor Sleep" message 1318 to the power manager module 520 acknowledging the power control has occurred.

In FIG. 14, a sequence drawing 1400 of the background task module 530 of FIG. 5 is shown. The UPS receiver control module 502 sends a "Os Schedule Task" message 1402 to the operating system (OS) services module 1402. The "Os Schedule Task" message 1402 may be sent every second in the current implementation. The OS services module 1402 then sends an "Activate Task" message 1404 to the BO task module 530, The BG task module 530 then sends a "SVSC Maintenance" message 1406 to the SV data module 510. The "SVSC maintenance" message 1406 causes the SV data module 510 to be updated/cleaned up. A response 1408 is sent form the SV data 510 to the BO task module 530. The 130 task module 530 then sends a "VL Maintenance" message 1410 to the visible SV list module 508. The visible SV list module 508 then sends a response 1412 to the BG task module' 530. Similarly, the BG task module 530 sends a "Battery Backup" message 1414 that contains position, time, and clock information to the non-volatile memory (NVM) 1404. The NVM 1404 sends a "Get Pos, Time, Clock" message 1416 to the BEP module 524 and the BEP module 524 responds back in a message 1418 to the NVM 1404. The NVM 1404 is a type of memory that is used to store data when the GPS receiver 100 is powered down or in a reduced powered state with some or all the subsystems turned off. The BG task module 530 also updates the UI GPS module 520 at periodic intervals, such as every second, with a "UI Once Sec Task" message 1420 and the UI GPS module acknowledges the update 1422.

Next in FIG. 15, a flow diagram 1500 of the signal processing subsystem 204 of FIG. 2 is shown. The signal processing subsystem 204 receives a seq_SS2ON 1502 signal that may be latched in a buffer ss2On 1504 that enables the master control state machine 1506 in the signal processing subsystem 204. The master control state machine 1506 receives the current state information from the signal processing subsystem hardware and commands from the channel random access memory (RAM). The master control state machine 1506 may also receives a signal "ss2 done" when the hardware is finished processing the current channel.

The master control state machine 1506 may turn on the hardware and request access to the channel RAM. A channel in RAM may be 128 words of 64 bits of memory and pointers from one channel to the next link multiple channels. The channels may be configure as a linked list or may be circular. The data from the channel RAM is received by the signal processing subsystem 204 at an input register 1508.

A semaphore word 1510 that controls the operation of the signal processing subsystem 204, FFT subsystem 204 and the software is updated and if predetermined bits are set in the semaphore word 1510, then signal processing commences in the signal processing subsystem 204, a semaphore word may be a grouping of bits that used to signal events and other occurrences between subsystems. If an event occurs that requires the processing of data to be paused, a bit may be set in the pause register 1512. The pause register 1512 may be used to debug the signal processing subsystem 204 and may be also used by the software to update the signal processing subsystem 204 to known states.

Turning to FIG. 16, an illustration of the master control state machine 1506 of FIG. 15. The master control state machine 1506 starts when the master control state machine is on 1602. If on 1602, then channel lapping is checked 1604, The channel lapping check 1604 verifies that the signal processing subsystem 204 is not overwriting a context of channel RAM used by the FFT subsystem 206. If lapping has not occurred 1604, then the semaphore word is checked 1606. Otherwise, the signal processing subsystem 204 stalls until the FFT subsystem 206 is within a context.

The semaphore values are checked 1608 and if the channel pause bit is set, then the pause flag is set 1610 and the semaphore word is read again 1606. The channel pause is used to freeze the operation of the signal processing subsystem 204 until software starts again. The pause may be used in debugging the signal processing subsystem 204 or may be used to update the signal processing subsystem 204 to a known state. If the semaphore value 1608 indicates that the channel is off, then a channel may be selected 1612 by updating the channel base. If the semaphore indicates that the signal processing subsystem is not stopped or paused, then active channel may be set or cleared 1614.

A check is made to determine if the signal processing subsystem 204 should be turned on 1616. If it should not be turned on, then a check is made to see if an overflow of the channel RAM has occurred 1618. If an overflow has not occurred 1618, then the current channel is deactivated 1620. Otherwise, if an overflow condition exist 1618, then a bit in the semaphore word is set and interrupts are enabled 1622. If the signal processing subsystem 204 is to be turned on, then the input buffers (fifo1 and fifo 2) and the signal processing subsystem 204 are initialized 1624 to execute on a selected channel. The signal processing subsystem 204 may be run for a predetermined amount of time 1626 (typically long enough to process the selected channel) that may be adjusted by the software and may depend on the operational mode of the GPS receiver 100.

A determination is made if the cross-correlator needs to run 1628. The cross-correlator runs once after the first even run. If the cross-correlator does need to run 1628, then the signal processor subsystem 204 and fifo 2 are initialized for cross-correlation 1630. The cross-correlator is then run 1632 and then a determination is made as to if more satellite vehicles need to be processed 1634 and if so, step 1630 is preformed again, Otherwise the semaphore is updated with indicating that the signal being processed is valid 1636.

If cross-correlation is complete 1636 or has already been run 1628, then a check is made for more frequencies to process (lsb/msb, odd,even) 1638. If another frequency does need to be processed 1638, then the position pointer is adjusted 1640 to the frequency needing processing and the signal processing subsystem 204 and fifo 1 and fifo 2 are initialized to the unprocessed channel 1624. Otherwise, no more frequencies are required to be processed 1638 and shutdown state information is saved 1642 and the semaphore word is updated and interrupts enabled 1622, If the signal processing system 204 is not on 1602 then the signal processing system 204 is reset 1644.

In FIG. 17, an illustration of the master control state machine 1700 for the FFT subsystem 206 of FIG. 2 is shown. If the GPS receiver is on 1702, then the semaphore word is read 1704. Otherwise, if the GPS receiver is not on then a reset occurs 1706. If the semaphore values indicate a channel pause 1708 then the pause flag for the FFT subsystem 206 is set 1710 and the semaphore word is read again 1704. If the semaphore indicates that the channel is not on 1708, then a determination is made to see if the channel is stalled 1712 in the signal processing subsystem 204. The channel is rechecked until it is not stalled 1712 and the channel pointer is updated 1714.

If the semaphore values indicate that the channel is on and not paused 1708, then the channel that is on is activated 1716 and the FFT subsystem 206 and fifo 2 for the channel are initialized 1718. A determination is made if data Is available in fife 2 (from the signal processing subsystem 204) 1720. If data is not available 1720, then a check is made if the channel in the signal processing subsystem 204 is stalled 1722 and rechecked until data is available 1720. If the channel in the signal processing subsystem 204 is not stalled 1722, then a check is made to verify the report context is enabled and the NCO is updated with correction value 1724. If it is enabled then a report "context" is generated 1726 and the hardware tracking loop and software aiding is used to update the NCO value in the channel RAM 1728. If the report context is not enabled or NCO updated with the correction value 1724, then a check occurs to see if a 100 ms report needs to be generated 1730. If the report needs to be generated 1730, then it is generated 1732 and the hardware tracking loop and software aiding is updated 1728. The shut down state information is saved 1734 and the semaphore word is updated and interrupts are enabled 1736. The current channel is then deactivated 1738 and the channel pointer updated 1714.

If fifo 2 data is available 1720, and the cross-correlator is on 1740, then a check is made for cross-correlator data 1742. If the cross-correlator data is available 1742, then the cross-correlator and FFT 322 are enabled 1744 and the next cross-correlator data pointer is read 1746. Then a check is made to see if the FFT 332 is done 1748. Similarly, if the cross-correlator is not on 1740, then the FFT 332 is enabled for one PDI (unit of data required by the FFT to run) 1750. Also, if the data is available for the cross-correlator 1742, then the FFT 332 is enabled for a PDI 1750.

If the FFT is not done 1748, then checks are repeated unit is finished. Once the FFT is finished 1748, then a check is made to verify if the fifio with PDI data has been processed 1752. If the fifo of PDI data has not been fully processed, then a check is made for a termination code 1754. If the termination code is not present, then the turnoff flag for the signal processing subsystem 204 and the FFT subsystem 206 are set 1756 another check is made to determine if fifo 2 data is available 1720. Otherwise, if the termination code is present 1756, then another check is made to determine if fifo 2 data is available 1720.

If the fifo of PDI data has been processed, then a check is made if the non-coherent summation (NCS) is finished 1758 and is repeated unit the NCS of the PDI data is complete. Once the NCS is complete 1758, then the number of PDIs and odd/even frequency counters 1760 are updated. The hardware tracking loop is then updated 1762 and a check to see if the PDI data is paused 1764. If the PDI data is paused, then the pause flag is set 1766. Once the pause flag is cleared or if the PDI is not paused 1764, then a check is made for a termination condition 1768. If no termination code is present 1768, than a check is made if fifo 2 data is available 1720. Otherwise, if the termination code is found 1768 and the turnoff flag is set 1770 for the signal processing subsystem 204 and the FFT subsystem 206 followed by a check to determine if the fifo 2 data is available.

Turning to FIG. 18, a channel sequencing control diagram 1800 illustrating the communication between signal processing subsystem 204 of FIG. 2 and FFT subsystem 206 of FIG. 2 using the memory subsystem 208 of FIG. 2. The signal processing subsystem 204 is shown with a circular link list of channels 1802, 1804, 1806, 1808, 1810, and 1812. The "FIFO zone" is an area in the memory subsystem 208 that contains the buffer pointers 1814 in addition to the reregisters 1816 and pointers 1818 used to process data through the signal processing subsystem 204 and the FFT subsystem 206. An area in memory is also allocated for a channel record 1820 that contains semaphores associated with the different channels. Similarly, the FFT subsystem 206 executes on the same plurality of channels 1802, 1804, 1806, 1808, 1810, and 1812. The "FIFO zone 208 also has buffers 1822, pointers 1824 and registers 1826.

The signal processing subsystem 204 processes its associated channel 1802, 1804, 1806, 1808, 1810, and 1812 independent from the FFT subsystem 206. The only requirement is that a channel should be processed by the signal processing subsystem 204 prior to being processed by the FFT 206 subsystem. If the signal processing subsystem 204 gets ahead of the FFT subsystem 206, then data in the channels of the FFT subsystem 206 is overwritten prior to being processed. Therefore, lapping rules are established and implemented in software that prevents a lapping condition for occurring.

Turning to FIG. 19, a list 1900 of lapping rules to prevent the signal processing subsystem from overwriting memory used by the FFT subsystems of FIG. 15 is shown. The list of lapping rules is implemented in software. First rule 1902 is that the signal processing subsystem 204 and FFT subsystem 206 may not lap each other.

The second rule 1904 is that the signal processing subsystem 204 may not enter a channel (i.e. make active) if the FFT subsystem 206 is currently active with that channel. This rule prevents the signal processing subsystem 204 from lapping the FFT subsystem 206.

The third rule 1906 is that the FFT subsystem 206 may not exit a channel if the signal processing subsystem is currently active with that channel. This rule prevents the FFT subsystem 206 from lapping signal processing subsystem 204 and allows the FFT subsystem 206 to process data as it become available if the signal processing subsystem 204 is active.

The forth rule 1908 is that the signal processing subsystem 204 will process the number of milliseconds it has been programmed to process inclusive of software corrections time. This rule maintains the signal processing subsystem 204 in a channel until processing is complete.

The fifth rule 1910 is that the FFT subsystem 206 will process as much data as is available in its buffer. This rule has the FFT subsystem 206 processing data in the FFT buffer up to the stored buffer pointers if the signal processing subsystem 204 is not active or up to the point where the signal processing subsystem 204 completes if the signal processing subsystem 204 is complete.

The sixth rule 1912 is that the signal processing subsystem 204 and FFT subsystem 206 may be prevented from continuing processing by a pause semaphore or pause flag. This enables the signal processing subsystem 204 to be stalled by the FFT subsystem 206 context (channel) being done or by the FFT subsystem 206 PDI data being done. The FFT subsystem 206 may also be stalled if the FFT subsystem 206 PDI data is done.

The channel pointer may be used to determine if both channels being accessed by the different subsystem are equal. Further, the coherent buffer pointer and active flag may be used to determine if the signal processing subsystem 204 and FFT subsystem 206 are in the same buffer. The use of shared buffers may mean two different channels may be active in the same buffer and are treated from a "FIFO perspective: as if the same channel was trying to access it.

Turning to FIG. 20, an illustration 2000 of the semaphore and interrupt structure for communication between the subsystems of FIG. 2 and software is shown. A location in memory is identified for enable pause bits 2002. The number of bits will be based the number of subsystems, i.e. one bit for the signal processing subsystem 204 and another bit for the FFT subsystem 206.

Three 32-bit words 2004, 2006 and 2008 are identified for semaphore and interrupt communication. The words/bits are aligned in a predetermined order with the higher addressed 32-bit word 2004 is divided into two sixteen bit sub-words. The first sub-word 2010 has semaphore and interrupts bits for the software controlling the PET subsystem 206 and the second sub-word 2012 is associated with the software controlling the semaphore and interrupts for the signal processing subsystem 204. The next 32-bit word 2006 has the semaphore and interrupts for software. The other 32-bit word 2008 is from an interrupt mask. By setting selected bits across the memory 2004, 2006 and using mask 2008, communication can occur with binary "and" and "or" operations across the memory.

In FIG. 21, a bit level illustration 2100 of the semaphore and interrupt mask of the interrupt structure of FIG. 20 is shown. The bits are associated with a subsystem or software and only writable by that entity. In other words, only the FFT subsystem 206 may write to SS3 bits and only the signal processing subsystem 204 may write to SS2 bits. For example, if an error occurs in the hardware of the PET subsystem 206, bit 59 2102 in the semaphore 2006 is set to "1". Bit 27 2104 associated with the software in the FFT subsystem 206 semaphore 2010 is still "0" and an "OR" operation on the bits results in a "1", i.e. an error condition being signaled. If the interrupt enable bit 27 2106 is set to "1" then an interrupt pulse is sent. An acknowledgement of the error condition by software occurs when the software sets bit 27 2104 in word 2010 to "1" and the "XOR" of the bits being a zero. Thus an approach to communication between subsystems is achieved with minimal communication overhead and little memory uses.

The software controlling the signal processing subsystem 204 and the FFT subsystem 206 may provide software aiding to the hardware tracker when the GPS receiver 100 is in a track mode. The software aiding advances the NCO 312, FIG. 3, in order to aid in looking for a satellite. The software aiding nudges the clock forward or backward by storing a differential of the values and arming the change via the semaphore communication. The differential is stored in the channel record and used when the channel or context is processed.

FIG. 22 is a flow diagram 2200 of time adjustment of the signal processing subsystem 204 of FIG. 2 within a T1 phase. The time adjustment starts 2202 with a change to the current time (differential time value) stored in the channel record. The signal processing subsystem 204 is functioning at such a rate that the time may not be directly adjusted. The software sends a command signaling a T1 phase adjustment is ready by using the signal processing's subsystem's semaphore bit 2204. The software bit for the signal processing subsystem 206 is set. The differential time value is retrieved by the signal processing subsystem 206 and used to adjust the NCO 312, of FIG. 3. The hardware of the signal processing subsystem 206 responds to the software by setting the hardware signal processing subsystem's semaphore bit at the end of the context where the adjustment was performed 2208. The flow diagram 2200 is shown as stopping 2210, but in practice the flow may have additional steps or be repeated.

In FIG. 23, a flow diagram 2300 of the time adjustment of the FFT subsystem 206 of FIG. 2 within a T1 phase is shown. The FFT subsystem 206 is also running at such a rate that simply changing the time is impractical. A differential time value for the time change may be generated by the software tracking loop 408, FIG. 4 as stored in memory. The flow diagram 2300 starts 2302 when the software initiates a T1/PDI phase adjustment using the FFT subsystem's software semaphore bit 2304. The hardware of the FFT subsystem performs the phase adjustment at the end of the first PDI processed by the FFT subsystem 2306. The hardware performs phase adjustment by one time usage of T1 and the address pointer is incremented 2308. The hardware of the FFT subsystem 206 then responds to the phase adjustment command by setting the subsystem's hardware semaphore bit at an end of the current context 2310. If context reporting is enabled 2312, then the hardware of the FFT subsystem 206 sets the "adjust performed" bit in the context report 2314 and processing stops 2316. Otherwise if context reporting is not enabled 2312, then processing stops 2316. In practice, processing may continue with addition steps or the flow diagram 2300 may be executed again.

In FIG. 24, a diagram of the match filter 308 of FIG. 3 that is configurable by software is shown. The match filter may be configured by software as a single filter or may be subdivided in multiple smaller match filters. The match filter 308 is shown with 32 sets of 32 bit sample registers 2402, 2404, 2406, 2408, 2410, . . . , 2412, 2414 for a sample that could be 1024 bits long, Each set of 32 bit sample register has a respective 32 bit code register 2416, 2418, 2420, 2422, . . . , 2424, 2426. The GPS signal data arrives at the match filter 308 from the signal processor 306 that interpolates and rotates the data. The sets of registers may be divided into subgroups and each subgroup may process a channel or context.

The configuration of the match filter 308 is accomplished with maps that contain configurations for the hardware resources of the match filter 308. The map may be selected by the type of mode that the GPS receiver 100. A lock mode would use a map that uses all 32 sample registers to scan all code space. If location aiding is available then a map may be used that allocates ⅛ of the sample registers to a channel, while using coherent accumulation to build up the signal. The maps ultimately control the hardware setup and the memory configuration for access by the input sample subsystem 202, signal processing subsystem 204, and the FFT subsystem 206.

The maps may configure the baseband hardware not just the matched filter 308. The maps provide a basis for channel allocation that is predetermined such that the channel assignments are not arbitrarily located in time or memory. Each map provides for specified number of channels for particular operations. For example maps will define the allowable number of acquisition, tracking and background channels. This provides the flexibility needed by the software to configure the hardware for the current acquisition and tracking needs in the system. For example at initialization when acquisition is important the acquisition map will provide more acquisition channels and less tracking channels and during steady state normal operation when tracking is the normal operational mode the tracking map will provide more tracking channels and few acquisition channels. The maps provide a piecewise optimized memory and throughput assignment for various operational scenarios for the receiver.

If the match filter 308 of FIG. 24 is partitioned by a map for ¼ msec summation, then the match filter is divided into eight groups of eight sample registers. The input signal is shifted into a 32 bit shift register 2428 and loaded into the 32 bit shift register 2402. An "exclusive or" operation (2430, 2432, 2434, 2436) is done between each of the eight sample registers and code registers respectively. The results are summed by a coherent accumulator 2438 into a ¼ msec accumulation. Pairs of ¼ msec accumulations (i.e. from coherent accumulators 2438 and 2440) may be combined by coherent accumulator 2442 into a ½ msec accumulation. Similarly, two ½ msec accumulations (i.e. 2442 and 2444) may be combined by another coherent accumulator 2446 into a full msec accumulation.

In FIG. 25, a flow diagram 2500 of an expert GPS control system that resides in the UPS receiver controller 502 of FIG. 5 is shown. The steps start 2502 with the processing of data for use in search strategy from acquisition and track modules 2504. The interface is then checked for the status of the acquisition 2506. An output message is created if the appropriate time has been reached to acquire data 2508, The receiver is checked to identify if a 100 ms boundary has been met or if the measurements are available and resources may be reallocated by the expert system 2510. The commands issued to the interface relating to the satellite vehicle (SV) are checked 2512. The expert system then receives information about the processing of new and updated SV records in order to determine a search strategy. The hardware status (memory, execution, buffers, timers, filters, clocks, correlators) is checked and reported to the expert system 2516. The process steps are then repeated. The process is shown as a simplified control loop, but in other implementations a more advanced adaptive control loop may be used.

Another aspect of the expert system is considering power control when determining a search strategy. By accessing the QoS module 506, the expert system can determine the amount of resources required to acquire the GPS signals. Further, the expert system can make determinations as to what subsystems to power down and if the whole GPS receiver 100 should be powered down to reduce power consumption.

It is appreciated by those skilled in the art that the modules and flow diagrams previously shown may selectively be implemented in hardware, software, or a combination of hardware and software. An embodiment of the flow diagram steps may employ at least one machine-readable signal-bearing medium. Examples of machine-readable signal bearing mediums include computer-readable mediums such as a magnetic storage medium (i.e. floppy disks, or optical storage such as compact disk (CD) or digital video disk (DVD)), a biological storage medium, or an atomic storage medium, a discrete logic circuits) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EPROM), or equivalent. Note that the computer-readable medium could even be paper or another suitable medium, upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal bearing mediums. Computer-readable signal bearing mediums have a modulated carrier signal transmitted over one or more wire based, wireless or fiber optic networks or within a system. For example, one or more wire based, wireless or fiber optic network, such as the telephone network, a local area network, the Internet, Blue Tooth, or a wireless network having a component of a computer-readable signal residing or passing through the network. The computer readable signal is a representation of one or more machine instructions written in or implemented with any number of programming languages.

Furthermore, the multiple steps implemented with a programming language, which comprises an ordered listing of executable instructions for implementing logical functions, can be embodied in any machine-readable signal bearing medium for use by or in connection with an instruction execution system, apparatus, or device, such as a computer-based system, controller-containing system having a processor, microprocessor, digital signal processor, discrete logic circuit functioning as a controller, or other system that can fetch the instructions from the instruction execution system, apparatus, or device and execute the instructions.

We claim:

1. A satellite positioning receiver, comprising:
    a signal processing subsystem including a signal input and configured to process an inputted signal at the signal input and output the processed signal;
    a Fast Fourier Transfer (FFT) subsystem configured to receive the processed signal, determine parameters from the processed signal, and output the determined parameters;
    a hardware tracking loop configured to receive the determined parameters from the FFT subsystem and determine one or more corrections for adjusting the signal input to the signal processing subsystem, wherein the hardware tracking loop is controlled by an oscillator;
    a processor; and
    a memory coupled to the processor, the memory including one or more instructions that when executed by the processor, cause the satellite positioning receiver to implement a software tracking loop for selectively assisting the hardware tracking loop in determining the one or more corrections for adjusting the signal input to the signal processing subsystem.

2. The satellite positioning receiver of claim 1, wherein the memory is configured to receive the determined parameters, from the FFT subsystem, and store the determined parameters.

3. The satellite positioning receiver of claim 2, wherein the one or more instructions, when executed by the processor to implement the software tracking loop, cause the processor to:
    access the memory to retrieve the determined parameters;
    use the determined parameters to assist the hardware tracking loop in determining the one or more corrections for adjusting the signal input of the signal processing subsystem.

4. The satellite positioning receiver of claim 3, wherein the one or more instructions, when executed by the processor to assist the hardware tracking loop in determining the one or more corrections for adjusting the signal input of the signal processing subsystem, cause the satellite positioning receiver to adjust the oscillator controlling the hardware tracking loop.

5. The satellite positioning receiver of claim 3, wherein the one or more instructions, when executed by the processor to use the determined parameters to assist the hardware tracking loop in determining the one or more corrections for adjusting the signal input of the signal processing subsystem, cause the satellite positioning receiver to adjust a numeric coded oscillator of the signal processing subsystem, wherein the signal processing subsystem is configured to use the numeric coded oscillator for processing the inputted signal.

6. The satellite positioning receiver of claim 5, wherein the oscillator controlling the hardware tracking loop is the numeric coded oscillator.

7. The satellite positioning receiver of claim 3, wherein the one or more corrections are numeric coded oscillator corrections provided by the hardware tracking loop to a numeric coded oscillator of the signal processing subsystem, wherein the signal processing subsystem is configured to use the numeric coded oscillator for processing the inputted signal.

8. The satellite positioning receiver of claim 1, wherein the FFT subsystem, in determining the parameters, is configured to determine I and Q samples of the processed signal, wherein the parameters include the I and Q samples.

9. A method for operating a satellite positioning receiver, comprising:

receiving a signal at a signal input of a signal processing subsystem;

processing the received signal by the signal processing subsystem;

determining parameters from the processed signal by a Fast Fourier Transfer (FFT) subsystem;

using the parameters to determine one or more corrections, by a hardware tracking loop, for adjusting the signal input of the signal processing subsystem; and using a software tracking loop to selectively assist the hardware tracking loop in determining the one or more corrections.

10. The method of claim 9, further comprising:

storing, in a memory of the satellite positioning receiver, the determined parameters from the FFT subsystem.

11. The method of claim 10, wherein using the software tracking loop to selectively assist the hardware tracking loop in determining the one or more corrections comprises:

accessing the memory to retrieve the determined parameters; and using the determined parameters to assist the hardware tracking loop in determining the one or more corrections.

12. The method of claim 11, wherein using the software tracking loop to selectively assist the hardware tracking loop in determining the one or more corrections further comprises:

adjusting an oscillator used by the satellite positioning receiver in controlling the hardware tracking loop.

13. The method of claim 9, wherein the signal processing subsystem uses a numeric coded oscillator to process the received signal, further comprises:

adjusting the signal input of the signal processing subsystem using the one or more corrections, wherein adjusting the signal input comprises adjusting the numeric coded oscillator.

14. The method of claim 13, further comprising:

using the numeric coded oscillator by the satellite positioning receiver in controlling the hardware tracking loop.

15. The method of claim 9, wherein determining parameters by the FFT subsystem comprises:

determining I and Q samples of the processed signal.

* * * * *